(12) United States Patent
Adam et al.

(10) Patent No.: US 12,413,557 B2
(45) Date of Patent: Sep. 9, 2025

(54) TRUSTED EXECUTION ENVIRONMENT FOR SERVICE MESH

(71) Applicant: International Business Machines Corporation, Armonk, NY (US)

(72) Inventors: Constantin Mircea Adam, Norwalk, CT (US); Nerla Jean-Louis, Champaign, IL (US); Hubertus Franke, Cortlandt Manor, NY (US); Edward Charles Snible, Bronx, NY (US); Abdulhamid Adebowale Adebayo, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 775 days.

(21) Appl. No.: 17/530,185

(22) Filed: Nov. 18, 2021

(65) Prior Publication Data
US 2023/0155984 A1    May 18, 2023

(51) Int. Cl.
*H04L 9/40* (2022.01)
*H04L 41/0866* (2022.01)
(Continued)

(52) U.S. Cl.
CPC ............... *H04L 63/0281* (2013.01)

(58) Field of Classification Search
CPC . H04L 63/0281; H04L 63/0823; H04L 63/20; H04L 63/105; H04L 67/02;
(Continued)

(56) References Cited

U.S. PATENT DOCUMENTS

2008/0021985 A1    1/2008  Belgaied et al.
2010/0318501 A1*  12/2010  Alaimo ............... G06F 21/64
                                                    707/694
(Continued)

OTHER PUBLICATIONS

International Search Report and Written Opinion received for PCT Application Serial No. PCT/EP2022/082051 dated Feb. 24, 2023, 13 pages.

(Continued)

*Primary Examiner* — Vu V Tran
(74) *Attorney, Agent, or Firm* — Amin, Turocy & Watson, LLP

(57) ABSTRACT

Techniques for managing and processing of configuration changes associated with a service container associated with a service mesh are presented. An application management component can determine immutable configuration data (ICD) relating to configuration change processing for the service container based on policies received from an application owner. A message processing component (MMC) of a service proxy associated with the service container can receive, via a control plane, a message associated with an untrusted entity. MMC can determine whether the message comprises a configuration change request relating to interaction between the application and the service mesh, and, if so, can determine whether to allow the service proxy to process the configuration change based on analysis of the configuration change and ICD. If ICD indicates the configuration change is not allowed, service proxy can discard the request. If ICD indicates the configuration change is allowed, service proxy can implement the configuration change.

20 Claims, 14 Drawing Sheets

(51) Int. Cl.
  *H04L 41/0894* (2022.01)
  *H04L 41/0895* (2022.01)
  *H04L 67/02* (2022.01)
  *H04L 67/10* (2022.01)
  *H04L 67/56* (2022.01)

(58) Field of Classification Search
  CPC ..... H04L 67/10; H04L 67/56; H04L 41/0866; H04L 41/0894; H04L 41/0895
  See application file for complete search history.

(56) References Cited

U.S. PATENT DOCUMENTS

| | | |
|---|---|---|
| 2017/0293762 A1 | 10/2017 | Karhunen |
| 2020/0127980 A1 | 4/2020 | Smith et al. |
| 2021/0019393 A1 | 1/2021 | Michalevsky et al. |
| 2021/0117242 A1 | 4/2021 | Van De Groenendaal et al. |
| 2021/0117249 A1 | 4/2021 | Doshi et al. |
| 2021/0281548 A1 | 9/2021 | Ackerly et al. |
| 2021/0328971 A1 | 10/2021 | Bandi et al. |
| 2022/0075885 A1* | 3/2022 | Dekel ................. G06F 16/2379 |
| 2022/0229748 A1* | 7/2022 | Ostrikov ............ G06F 11/0772 |
| 2022/0337417 A1* | 10/2022 | Sanders ................ H04L 67/34 |

OTHER PUBLICATIONS

"A Decentralized Architecture for Transparent and Verifiable Knowledge Manipulation in Untrusted Networks," An IP.com Prior Art Database Technical Disclosure, IPCOM000251032D, Oct. 2, 2017, 8 pages.

"Multi-party trusted application containers delivery in cloud," An IP.com Prior Art Database Technical Disclosure, IPCOM000259516D, Aug. 16, 2019, 3 pages.

"Secure Build and Policy Updates," An IP.com Prior Art Database Technical Disclosure, IPCOM000263761D, Oct. 2, 2020, 5 pages.

"Fully Decentralized Cloud using Generalized Trusted Execution Environments and Distributed Hash Tables (Without Blockchain)," An IP.com Prior Art Database Technical Disclosure, IPCOM000264923D, Feb. 5, 2021, 7 pages.

"The Paradigm Shift in Security with the 5G Standalone Network Infrastructure," Intel E2C Security eGuide, 2020, https://www.intel.cn/content/dam/www/central-libraries/us/en/documents/intel-e2c-security-eguide-fordistribution.pdf, 8 pages.

"Secure Memory Architectures in Emerging Electronic Systems," Macronix International Co., LTD., Aug. 16, 2019, 18 pages.

* cited by examiner

TRUSTED EXECUTION ENVIRONMENT FOR SERVICE MESH

BACKGROUND

The subject disclosure relates to electronic information processing, and more specifically, to a trusted execution environment for a service mesh. Zero trust has emerged as a new model for cybersecurity that can cover a collection of concepts and ideas designed to minimize uncertainty in enforcing accurate, least privilege, per request access decisions in information systems and services in the face of a network viewed as compromised. A zero trust architecture can be an enterprise cybersecurity architecture that can be based on zero trust principles and can implement the capability to verify virtually anything and everything trying to connect to, use, or modify the enterprise resources before granting access.

One existing approach for security for microservices provided by cloud service providers relates to an infrastructure processing unit (IPU) that can provide various security features including root of trust, attestation services, secure enclaves; storing encryption keys; separate control plane interface that can be measured (via certificate mechanisms); brokering data visibility between multiple clients for cooperative processing; secure and encrypted interfaces for external interfaces from the IPU; passive or active enforcement of security policies and services such as access control lists, rate limiting, intrusion detection, and distributed denial of service attacks. Although this existing approach may provide the aforementioned security features, this existing approach can be undesirably limited in effectiveness, use, and scope, as, for instance, this existing approach may not be able to effectively protect the IPU against some types of external attacks.

Another existing approach can relate to secure runtime systems and methods with trusted execution environment (TEE) and service mesh with sidecar proxies that can provide transport layer security termination for applications. This existing approach mainly focuses on authentication between components, as, for instance, it describes providing service authentication to connecting clients such that it can be proven to a client that it is communicating with an authentic service executing inside a secure runtime within a secure enclave. However, while this existing approach may provide certain security based on authentication between components, this existing approach can be undesirably limited in effectiveness, use, and scope, as, for instance, it does not address the dynamic nature of cloud computing environments and is deficient with regard to providing suitable security in cloud computing environments.

Still another existing approach relates to dynamic sharing in secure memory environments using sidecars where multiple pairs of microservice/sidecar instances can be arranged to support secure multi-tenancy management of data on the same edge computing platform via shared and managed encryption keys. This existing approach involves peer entities, such as tenants or microservices, being able to share data where such sharing may be based on the communication of an encryption key, used to encrypt the data in memory, from a proxy, such as a sidecar associated with a first microservice to a proxy associated with a second microservice. This existing approach also can be applied in a mesh configuration. However, while this existing approach may provide certain security with regard to exchanging information between peer entities, this existing approach also can be undesirably limited in effectiveness, use, and scope, as, for instance, this existing approach may not be able to effectively protect the service mesh, and applications utilizing the service mesh, from certain types of attacks.

For instance, existing service meshes can bring undesirable security risks into the system, as existing approaches with regard to application deployments based on a service mesh typically may assume that the infrastructure administrator and application owner belong to the same organization, and existing service meshes do not provide adequate protection for application owners against the cloud, cluster, or service mesh providers, particularly when the infrastructure administrator is a third-party entity that does not belong to the same organization as the application owner. As an example, a malicious insider entity of a cloud, cluster, or service mesh provider can undesirably escalate the malicious insider entity's privileges and abuse such privileges by getting insights into the current state of the service mesh, misconfiguring the service mesh to change the behavior of the connections and the behavior of the traffic that can be routed along those connections. The existing security model undesirably has the application owner trust that the cloud, cluster, and service mesh administrator, and associated entities, will not undesirably misconfigure the underlying infrastructure of the service mesh and get access to the data traffic or code (e.g., proprietary and/or confidential code) of the application owner.

These and other deficiencies of existing approaches relating to security for services provided by cloud service providers can result in deficient and/or ineffective security with regard to services provided by cloud service providers and data associated therewith.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, structures, computer-implemented methods, apparatuses, and/or computer program products that can facilitate secure processing of configuration changes associated with service containers associated with applications.

According to an embodiment, a computer-implemented method comprises determining, by a system operatively coupled to a processor, immutable configuration data relating to configuration change processing for a service container. The computer-implemented method also comprises: based on the immutable configuration data, determining, by the system, whether to allow a service proxy associated with the service container to process a configuration change associated with the service container and contained in a message associated with an untrusted entity identity. Such embodiments of the method can provide a number of advantages, including that the method can enhance security of service containers and data associated with applications and can prevent undesired configuration changes associated with service containers and applications.

In some embodiments, the computer-implemented method also can comprise: in response to determining that the configuration change is not authorized based on the analyzing of the immutable configuration data indicating that the configuration change is not authorized, determining, by the system, that the configuration change information relating to the configuration change is not allowed to be processed by the service proxy. In certain embodiments, the computer-implemented method further can comprise: controlling, by the system, the service proxy to prevent the service proxy from processing the configuration change information, wherein the preventing the service proxy from processing the configuration change information prevents the configuration change from being implemented. Such embodiments of the method can provide a number of advantages, including that the method can enhance security of service containers and data associated with applications and can prevent undesired configuration changes associated with service containers and applications, which desirably can prevent undesired interaction or communication between an application and a service mesh, which can comprise service containers and service proxies, some of which can be associated with the application.

Another embodiment relates to a system comprising a memory that stores computer-executable components; and a processor, operatively coupled to the memory, that executes computer-executable components. The computer-executable components can comprise a translator component that generates immutable configuration data relating to configuration change processing that is applicable to a service container. The computer-executable components also can include a message management component that, based on the immutable configuration data, determines whether to permit a service proxy associated with the service container to process a configuration change associated with the service container and contained in a message associated with an untrusted entity identity. Such embodiments of the system can provide a number of advantages, including that the system can enhance security of service containers and data associated with applications and can prevent undesired configuration changes associated with service containers and applications.

A further embodiment relates to a computer program product that facilitates secure configuration change processing associated with an application, the computer program product comprising a computer readable storage medium having program instructions embodied therewith. The program instructions can be executable by a processor to cause the processor to determine fixed configuration data relating to the configuration change processing for a service container. The program instructions also can be executable by the processor to: based on the fixed configuration data, determine whether to allow a service proxy associated with the service container to process a configuration change associated with the service container and contained in a message associated with a third party entity identity. Such embodiments of the computer program product can provide a number of advantages, including that the computer program product can enhance security of service containers and data associated with applications and can prevent undesired configuration changes associated with service containers and applications.

These and other features will become apparent from the following detailed description of illustrative embodiments thereof, which is to be read in connection with the accompanying drawings.

DETAILED DESCRIPTION

Figure 1:
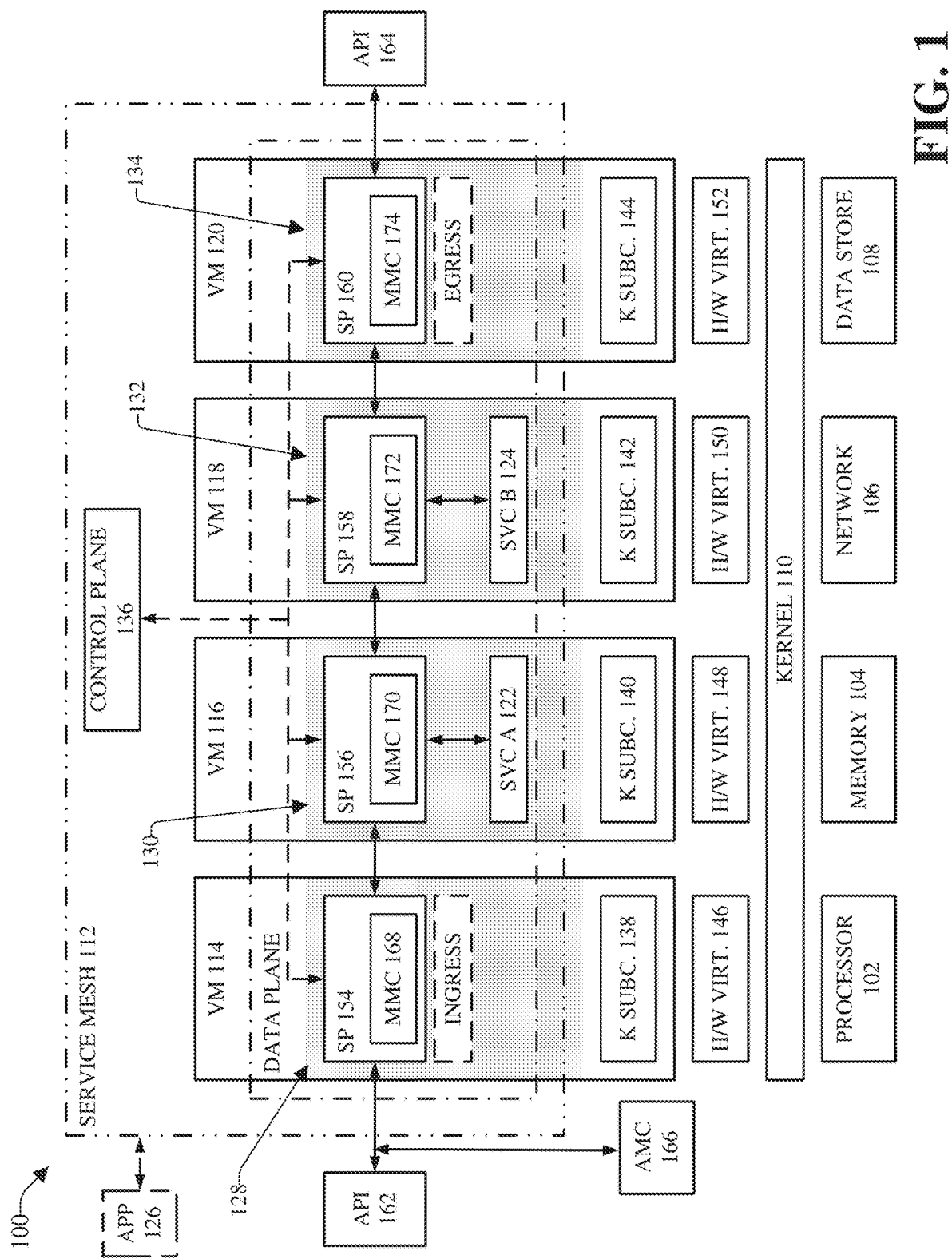
FIG. 1 illustrates a block diagram of an example, non-limiting system that can securely manage processing of configuration changes associated with a service container associated with a service mesh and an application, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Zero trust has emerged as a new model for cybersecurity that can cover a collection of concepts and ideas designed to minimize uncertainty in enforcing accurate, least privilege, per request access decisions in information systems and services in the face of a network viewed as compromised. A zero trust architecture (ZTA) can be an enterprise cybersecurity architecture that can be based on zero trust principles and can implement the capability to verify virtually anything and everything trying to connect to, use, or modify the enterprise resources before granting access.

In cloud-native applications, the applications usually can be implemented as a set of microservices. A service mesh can be used where, in the service mesh, each service instance can be paired with an instance of a reverse proxy server, which also can be referred to as a service proxy, sidecar proxy, or sidecar, to implement a ZTA. The service mesh can provide a multitude of desired functions, such as, for example, mutual authentication and encrypted communication between services, policy propagation and enforcement, and certificate rotation, that can facilitate filtering out certain external attackers and threats.

One existing approach for security for microservices provided by cloud service providers relates to an infrastructure processing unit (IPU) that can provide various security features including root of trust, attestation services, secure enclaves; storing encryption keys; separate control plane interface that can be measured (via certificate mechanisms); brokering data visibility between multiple clients for cooperative processing; secure and encrypted interfaces for external interfaces from the IPU; passive or active enforcement of security policies and services such as access control lists, rate limiting, intrusion detection, and distributed denial of service attacks.

Another existing approach can relate to secure runtime systems and methods with TEE and service mesh with sidecar proxies that provide transport layer security termination for applications. The runtime systems and methods can attempt to provide data security by preventing unauthorized users from seeing protected data or modifying the data. This existing approach mainly focuses on authentication between components, as, for instance, it describes providing service authentication to connecting clients such that it can be proven to a client that it is communicating with an authentic service executing inside a secure runtime within a secure enclave.

Still another existing approach relates to dynamic sharing in secure memory environments using sidecars where multiple pairs of microservice/sidecar instances can be arranged to support secure multi-tenancy management of data on the same edge computing platform via shared and managed encryption keys. This existing approach involves peer entities, such as tenants or microservices, being able to share data where such sharing may be based on the communication of an encryption key, used to encrypt the data in memory, from a proxy, such as a sidecar associated with a first microservice to a proxy associated with a second microservice. This existing approach also can be applied in a mesh configuration.

Although existing approaches may possibly provide some security features, existing approaches can be undesirably limited in effectiveness, use, and scope, as, for instance, this existing approaches may not be able to effectively protect the service mesh, and applications utilizing the service mesh, from certain types of attacks. For instance, existing service meshes can bring undesirable security risks into the system, as existing approaches with regard to application deployments based on a service mesh typically may assume that the infrastructure administrator and application owner belong to the same organization, and existing service meshes do not provide adequate protection for application owners against the cloud, cluster, or service mesh providers, particularly when the infrastructure administrator is a third-party entity that does not belong to the same organization as the application owner. As an example, a malicious insider entity of a cloud, cluster, or service mesh provider can undesirably (e.g., improperly, inappropriately) escalate the malicious insider entity's privileges and abuse such privileges by getting insights into the current state of the service mesh, misconfiguring the service mesh to change the behavior of the connections and the behavior of the traffic that can be routed along those connections. The existing security model undesirably has the application owner trust that the cloud, cluster, and service mesh administrator, and associated entities, will not undesirably misconfigure the underlying infrastructure of the service mesh and get access to the data traffic or code (e.g., proprietary and/or confidential code) of the application owner.

It can be desirable to suitably protect applications of application owners and associated data against cloud, cluster, or service mesh providers and/or other third-party entities (e.g., undesirable or untrusted entities). The disclosed subject matter can be implemented to produce a solution to all or at least some of these problems and/or other problems with existing techniques for providing security in connection with service meshes, services, and applications. The disclosed subject matter can mitigate (e.g., reduce, minimize, inhibit, or prevent) unauthorized changes or tampering with applications of application owners that are deployed by a third party, by providing desirable enhancements to a service mesh. The disclosed subject matter can give an application owner the capability to desirably shield or isolate the application owner's application from infrastructure administrators or other third-party entities. For instance, the disclosed subject matter can desirably limit the privileges that administrators have, for example, by preventing them from accessing the application components or intercepting data traffic generated by the application. The disclosed subject matter can still enable desirable performance of the service mesh, as the administrators still can maintain privileges that can allow them to manage the infrastructure associated with the service mesh on top of which the application is deployed.

To that end, the various embodiments herein relate to techniques for managing processing of configuration changes associated with a service container associated with a service mesh and an application. The disclosed subject matter can comprise a service mesh that can be associated with attested hardware (e.g., processor, memory, communication network, data store, and/or other desired hardware) and a hardened runtime can be employed. In some embodiments, if container virtualization is in place for applications, a desirable form of secure containers (e.g., Kata containers)

can be utilized that do not share an operating system kernel with the underlying host. The service mesh can be implemented on top of this layer.

The service mesh associated with the application can comprise a group of services (e.g., microservices) that can be associated with a group of service containers (e.g., secure service containers). Each service container can be associated with a service proxy (e.g., sidecar proxy or sidecar). With regard to each service container of the group of service containers, an application management component (AMC) can determine immutable configuration data relating to configuration change processing for the service container based on a set of policies received from an application owner (or an authorized entity acting on behalf of the application owner) via an interface (e.g., application programming interface (API) or other interface) or communication device associated with the application owner. The AMC can securely communicate respective immutable configuration data and/or other desired data (e.g., secure token, boot up data) to respective service proxies during a secure bootstrap process. The respective service proxies can securely boot up based on (e.g., using) the respective immutable configuration data and/or the other data.

An untrusted entity, such as a cluster administrator, a component or entity of the service mesh system, or another entity can communicate a message to a control plane associated with the service mesh, wherein the untrusted entity can be an entity that may not be fully trusted by application and/or the application owner. The message can comprise, or may not comprise, one or more requests for configuration changes associated with a service container(s), wherein a request for configuration change can involve a configuration change relating to an interaction between the application and the service mesh (e.g., interaction between components and/or services associated with the application). The control plane can generate a control plane message, comprising the request for configuration change (if any is requested) and/or other information based on the information of the message received from the untrusted entity.

A message processing component (MMC) of a service proxy associated with the service container can receive, via the control plane, the control plane message associated with (e.g., based on) the message of the untrusted entity. The MMC can decode and analyze the control plane message. Based on the results of the analysis, the MMC can determine whether the control plane message comprises one or several configuration change requests relating to an interaction between the application and the service mesh. That is, the MMC can determine whether the control plane message comprises a set of configuration change requests (e.g., one or more configuration change requests) for a set of resources associated with the application and service mesh, wherein each requested configuration change (if any is requested) can be evaluated by the MMC separately to determine whether such requested configuration change can be allowed or not. If the MMC determines that the control plane message does not comprise a configuration change request, the MMC can determine that the control plane message can be processed by the service proxy (e.g., message can be processed by a proxy of the service proxy). If the MMC determines that the control plane message does comprise configuration change requests, the MMC can determine whether to allow the service proxy to process each of the configuration changes based on analysis of the configuration change and the immutable configuration data associated with the service proxy. With regard to each configuration change request, if the MMC determines that the immutable configuration data indicates such configuration change is not allowed, the MMC can discard (e.g., delete or remove) that configuration change request and prevent the service proxy from processing that configuration change request and implementing the configuration change associated with it. If the MMC determines that the immutable configuration data indicates the configuration change is allowed, the MMC can communicate the information relating to the configuration change request to the proxy of the service proxy and the proxy can process the configuration change request and implement the configuration change.

In some embodiments, the AMC and/or MMC can implement access to a custom certificate authority that can ensure that no services or components can be added to the application by a third party (e.g., undesirable or untrusted entity). The custom certificate authority can comprise a certification management component that can provide (e.g., send or deliver) a secret token associated with the application to desired service proxies during a secure bootup phase. When an entity, such as a service proxy, desires to be added in connection with the application, a registration authority component can receive a certificate signing request (CSR) from the requestor entity (e.g., a service proxy). The registration authority component can determine whether the CSR is authorized based on analysis of the CSR to determine whether the CSR contains the secret token. If the CSR does not contain the secret token, the registration authority component can deny authorization for the CSR and associated requestor entity. If the CSR does contain the secret token, the registration authority component can determine the CSR and associated requestor entity is authorized, and can approve the CSR.

If the CSR is approved, the registration authority component can send a CSR approval message to the certificate authority component. The certificate authority component can sign a certificate indicating that the requestor entity is authorized in connection with the application (e.g., the requestor entity is authorized to be part of the application trust domain associated with the application). The certificate authority component can send the signed certificate to the requestor entity. The requestor entity can utilize the signed certificate to facilitate authenticating with another service proxy associated with the application trust domain. For example, the requestor entity can provide the signed certificate to a service proxy associated with (e.g., part of) the application trust domain associated with the application to facilitate authenticating with the service proxy and being added to the application trust domain.

These and other aspects and embodiments of the disclosed subject matter will now be described with respect to the drawings.

FIG. 1 illustrates a block diagram of an example, non-limiting system 100 that can securely manage processing of configuration changes associated with a service container associated with a service mesh and an application, in accordance with various aspects and embodiments of the disclosed subject matter. In accordance with various embodiments, all or a desired portion of the system 100 can reside in a cloud computing environment. The system 100 can comprise underlying hardware components, such as, for example, a processor 102 (e.g. central processing unit (CPU), memory 104, a network 106 (e.g., a communication network), and a data store 108 that can be associated with (e.g., communicatively connected to) each other (e.g., via the network 106). The system 100 also can comprise a kernel component 110 (KERNEL) that can be or comprise an operating system kernel that can be associated with the underlying hardware components. In some embodiments, the kernel component 110 can be a Linux kernel or another desired type of operating system kernel.

The system 100 can comprise a service mesh 112 that can comprise a desired number of virtual machines (VMs), such as, for example, VMs 114, 116, 118, and/or 120, that can perform operations on data and provide desired services, such as, for example, service A 122 (SVC A) and service B 124 (SVC B), for an application 126 associated with an application owner. In some embodiments, the VMs (e.g., 114, 116, 118, and/or 120) can be, can comprise, and/or can run secure containers (e.g., secure service containers, such as Kata containers or other desired type of virtualized containers), such as, for example, service containers 128, 130, 132, and/or 134. The service mesh 112 can comprise a control plane 136 that can be associated with (e.g., communicatively connected to) the VMs (e.g., 114, 116, 118, and/or 120) via a control plane interface. The VMs (e.g., 114, 116, 118, and/or 120) can comprise or be associated with respective kernel subcomponents, such as, for example, kernel subcomponents, 138, 140, 142, and/or 144 (K SUBC.), that can be associated with respective hardware virtualization components 146, 148, 150, and/or 152 (H/W VIRT.) to facilitate associating the respective kernel subcomponents and associated VMs with the kernel component 110 and underlying hardware (e.g., processor 102, memory 104, network 106, and data store 108).

The VMs (e.g., 114, 116, 118, and/or 120) and/or secure containers (e.g., 128, 130, 132, and/or 134) can comprise or be associated with service proxies, such as, for example, service proxy 154 (SP), service proxy 156, service proxy 158, and/or service proxy 160. A service proxy also can be referred to as a sidecar proxy or sidecar. The service proxies (e.g., 154, 156, 158, and/or 160) can run side by side with the secure containers (e.g., 128, 130, 132, and/or 134), and the service proxies can facilitate secure communications and interactions between the application 126 and components, devices, the control plane 136, and/or other entities external to the application 126. The service mesh 112 can receive data (e.g., content) via one or more APIs 162, where the VM 114 can act as an ingress point for the data, which can be received by the service proxy 154. In some embodiments, the data can be securely communicated to via the one or more APIs 162 and the service proxy 154 of the VM 114 using one or more security and/or authentication protocols, such as, for example, JavaScript object notation (JSON) web token (JWT), transport layer security (TLS), or other desired security and/or authentication protocols. The VM 114 can process the data, as desired, in accordance with the configuration of the VM 114, and, in accordance with desired protocols, the processed data can be communicated from the service proxy 154 to the service proxy 156 of the VM 116 for further processing by the VM 116, providing the service A 122. In some embodiments, the desired protocols can comprise an application layer-protocol, such as hypertext transfer protocol (HTTP), a remote procedure call (RPC) protocol, such as gRPC, and/or other communication network-related protocols, such as transmission control protocol (TCP). In certain embodiments, the processed data can be securely communicated between service proxies (e.g., 154, 156, 158, and/or 160) using a desired security process and secure communication channel (e.g., encrypted communication channel). The desired security process can be or comprise, for example, mutual TLS (mTLS) that can mutually authenticate the parties (e.g., service proxies) on each end of a network connection and data communication, and can establish an encrypted TLS connection between the parties.

The service A 122 can perform desired operations on the received process data to further process the data, in accordance with the service(s) provided by service A 122. A service can be a microservice, wherein microservices that can be provided in connection with the application 126 can comprise, for example, an interface (e.g., user interface, graphical user interface, or other type of interface), a video server, an audio server, a news server, a website server, a database, an online store server, a shopping cart (e.g., online shopping cart for an online store), an encryption and decryption service, and/or other desired types of services. The microservices can be combined, arranged, and utilized in a modular fashion depending on the data processing to be performed on the data for the application 126.

After the data has been processed by the service A 122, the service proxy 156 can communicate the processed data to the service proxy 158 of the VM 118, via the secure communication channel and using the desired protocols, for further processing by the VM 118 and the service B 124. The service B 124 can perform desired operations on the received process data to further process the data, in accordance with the service(s) provided by service B 124. After the data has been processed by the service B 124, the service proxy 158 can communicate the processed data to the service proxy 160 of the VM 120, via the secure communication channel and using the desired protocols, for further processing by the VM 120. The VM 120 can be an egress point for the processed data. The VM 120 can perform operations on the received process data to prepare the processed data for output, as output data, to a desired destination. The service proxy 160 can communicate the output data via a desired API 164 (e.g., external API) to the desired destination (e.g., an interface or communication device). In some embodiments, the data can be securely communicated to the desired API 164 using the desired security and/or authentication protocol(s) (e.g., JWT, TLS, or other security and/or authentication protocol).

It is to be appreciated and understood that, while some aspects and embodiments of the disclosed subject matter are being described with regard to the application 126, the system 100 can be or comprise a multi-tenant (e.g., multiple application owners), multi-application system that can facilitate implementing multiple applications concurrently (e.g., in parallel) and resources (e.g., hardware resources, service mesh, VMs, or other resources) of the system 100 can be shared among and utilized by the applications at various times.

As disclosed, it can be desirable to suitably protect applications (e.g., application 126) of application owners and associated data against cloud, cluster, or service mesh providers and/or other third-party entities (e.g., other undesirable or untrusted entities). To that end, the system 100 can comprise an application management component (AMC) 166 that can determine and generate immutable configuration data relating to configuration change processing for a service container (e.g., 128, 130, 132, or 134) based on a set of policies received from an application owner (or an authorized entity acting on behalf of the application owner) via an interface (e.g., API 162 or other interface) or a communication device associated with the application owner. The immutable configuration data can be employed to facilitate securing the components (e.g., service containers, VMs, and/or other components) and services associated with the application 126 from have undesirable configuration changes made (e.g., cloud, cluster, or service mesh providers and/or other third-party entities) that can undesirably alter the interactions between the application 126 and the service mesh 112 (e.g., undesirably modify interactions between a service container and another entity to enable the other entity to access data associated with the application the other entity should not have access to, and/or enable an undesired entity (e.g., undesired service proxy) to be added to communicate with authorized service proxies in an application trusted domain associated with the application). To further facilitate suitably protecting the application 126, the service proxies (e.g., 154, 156, 158, and/or 160) each can comprise a message processing component (MMC) (e.g., 168, 170, 172, and/or 174) that can manage the processing of messages (e.g., messages received from the control plane 136) and requests for configuration changes that can be contained in the messages, in accordance with respective immutable configuration data associated with the respective service proxies, such as described herein.

In some embodiments, the AMC 166 can receive policy information regarding a set of policies relating to configuration changes (e.g., immutable configuration or permitted configuration changes) associated with the service containers from the application owner (or an authorized representative thereof) of the application 126 via an interface (e.g., API 162 or other interface) or a communication device associated with the application owner. In some embodiments, the AMC 166 can provide or facilitate providing (e.g., presenting or displaying) an interface (e.g., user interface and/or touchscreen interface), buttons, and/or menus for the application owner to use to generate the policy information. For instance, the interface can comprise one or more menus showing various policies, rules, components, or other items that can be selected (e.g., using buttons and/or a mouse or trackpad) by the application owner to generate the set of policies. A policy of the set of policies can specify, for example, that traffic mirroring is only allowed from a cluster identified by trust_domain/cluster_1 to a cluster identified by trust_domain/cluster_2, but any other traffic mirroring requests are to be denied and discarded. That is but one non-limiting example and various types of policies can be specified by the application owner, including, but not limited to that example policy and the other example policies described herein.

With regard to each service container (e.g., 128, 130, 132, or 134), the set of policies can define a desired immutable configuration associated with the service container. The immutable configuration can relate to various types of policies, rules, components, or other items that are not permitted to be changed, or at least are not permitted to be changed without a verified approval (e.g., via a verified signature) from the application owner being provided in connection with a requested configuration change. When referring to the application owner, this can refer to the application owner or an authorized representative of the application owner. The types of policies, rules, components, or other items that can be addressed by the set of policies for immutable configuration can comprise or relate to, for example, authorization policies, routing destination rules, TCP or HTTP filters, gateways, installation operators, peer authentication, request authentications, service entries, workload entries, workload groups, and/or other desired types of policies, rules, components, or items. The authorization policies can relate to, for example, entities or components that can be authorized to interact with application components associated with the application 126. The routing destination rules can relate to the routing of data between application components and/or other entities, and/or the conditions under which data can be routed to a destination. The TCP or HTTP filters can relate to filtering of data being communicated using TCP or HTTP. The gateways can be network nodes associated with the service mesh 112. Peer authentication can relate to authentication procedures for peers (e.g., service proxies or other type of peers) to authenticate with each other. The request authentications can relate to requests for an entity to authenticate with another entity. Service entries can identify or describe properties (e.g., domain name system (DNS) name, VIPs, ports, protocols, or endpoints) of services and/or provide other details relating to services implemented or performed by VMs or service containers. A service entry also can be utilized to select a workload The workload entries can enable descriptions of properties of workloads, such as VMs or bare metal servers. The workload groups can relate to or describe a collection or group of workload instances. Through the set of policies, the application owner can specify which types of policies, rules, components, or items are immutable (e.g., are not to be reconfigured), and/or which types of policies, rules, components, or items are not immutable, and/or which types of policies, rules, components, or items are conditionally immutable unless a verified approval (e.g., verified signature) of the application owner is provided in connection with the requested configuration change.

Figure 2:
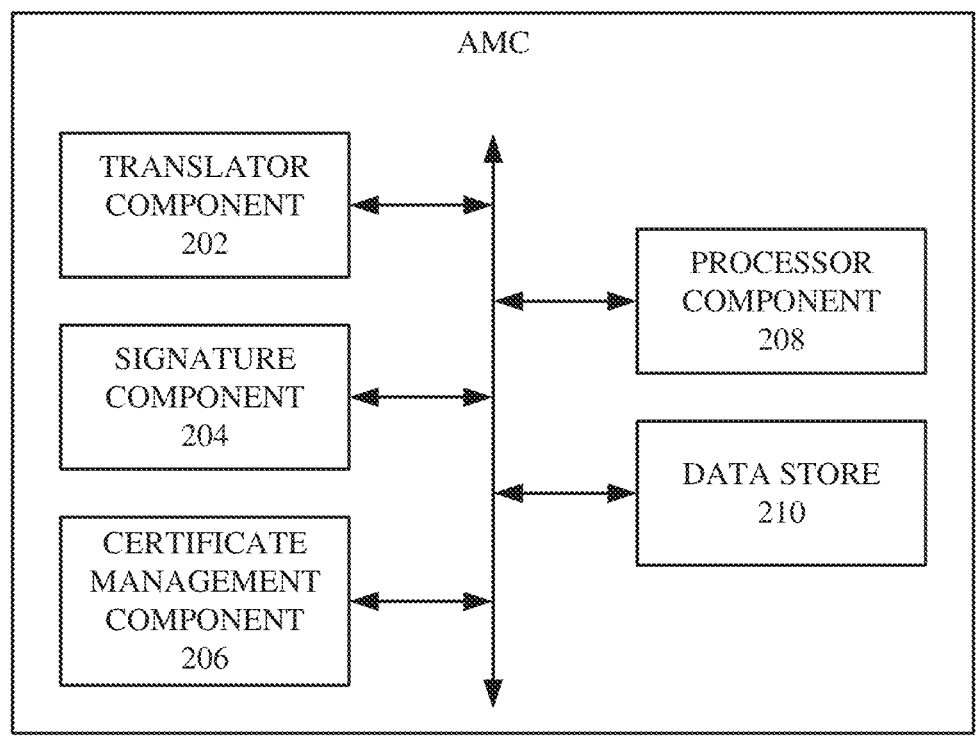
FIG. 2 depicts a block diagram of an example application management component, in accordance with various aspects and embodiments of the disclosed subject matter, in accordance with various aspects and embodiments of the disclosed subject matter.

Referring to FIG. 2 (along with FIG. 1), FIG. 2 depicts a block diagram of an example AMC 166, in accordance with various aspects and embodiments of the disclosed subject matter. The AMC 166 can comprise a translator component 202 that can analyze the policy information with regard to each service container (e.g., 128, 130, 132, or 134). Based on the analysis results, the translator component 202 can identify the policies described therein, and which policies, rules, components, or other items associated with the service container are to be considered immutable and/or are conditionally immutable unless a verified approval of the application owner is provided. The translator component 202 can employ a configuration generation tool that can translate (e.g., convert) the policy information to determine and generate immutable configuration data associated with the service container, wherein the immutable configuration data can be in a desired format and protocol that can be understood and utilized by the service proxy (e.g., 154, 156, 158, or 160) associated with the service container (e.g., 128, 130, 132, or 134).

Figure 3:
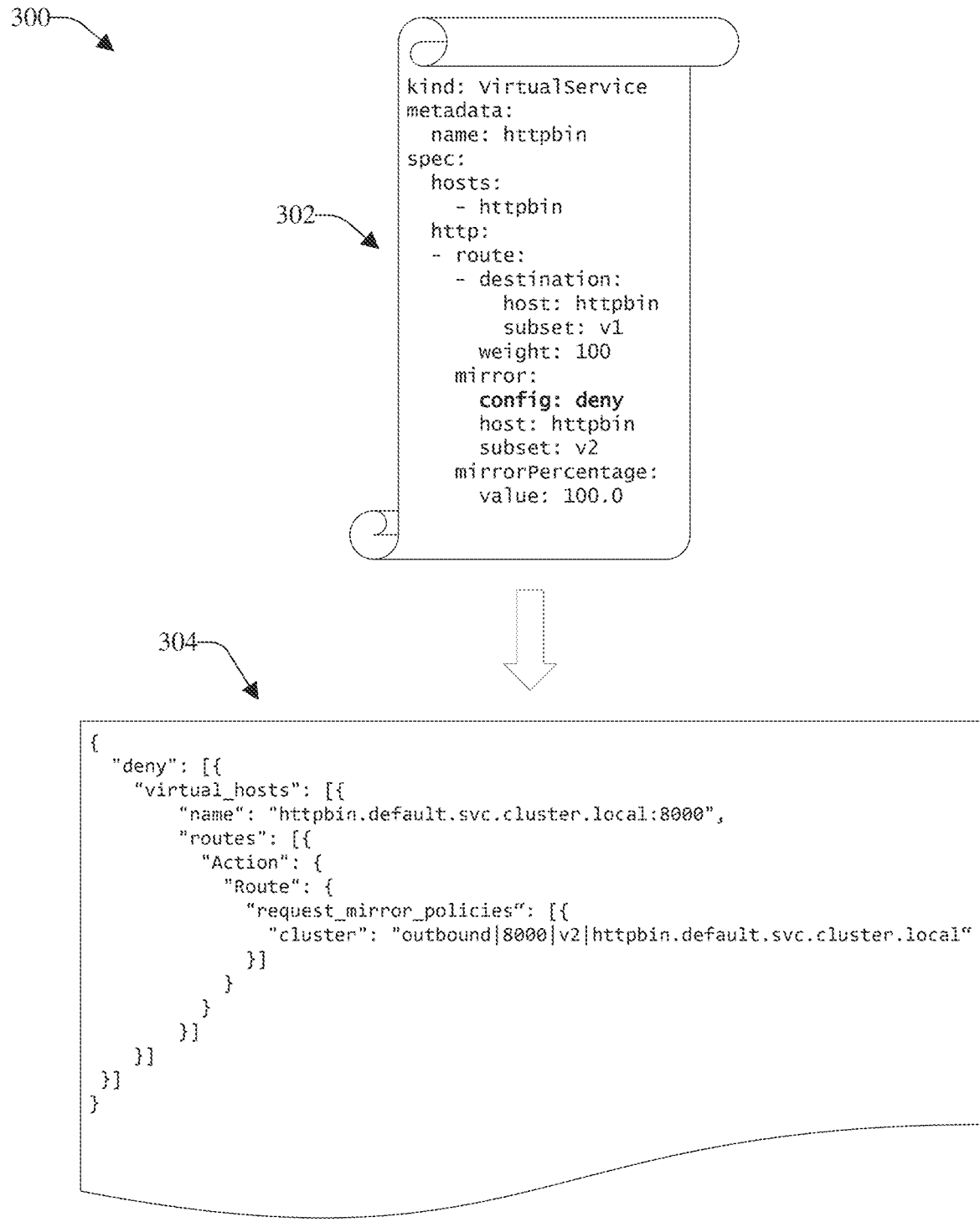
FIG. 3 illustrates a diagram of a non-limiting example immutable configuration data generation flow, in accordance with various aspects and embodiments of the disclosed subject matter.

Referring to FIG. 3 (along with FIGS. 1 and 2), FIG. 3 illustrates a diagram of a non-limiting example immutable configuration data generation flow 300, in accordance with various aspects and embodiments of the disclosed subject matter. The example immutable configuration data generation flow 300 can present non-limiting example pseudocode relating to immutable configurations. As depicted in the example immutable configuration data generation flow 300, the application owner can define the immutable configuration associated with a service container associated with the application through a set of policies 302. The set of policies 302 can comprise, for example, a policy relating to a virtual service named "httpbin" associated with the application, wherein the policy can specify that a configuration change for mirroring data traffic of the virtual service (e.g., virtual service named httpbin, subset: version 1 (v1)) to send the data traffic to another entity (e.g., httpbin, subset: version 2 (v2)) is denied (e.g., is immutable). In some embodiments, a policy can specify that a particular configuration change can be conditionally immutable unless a verified approval associated with the application owner is provided in connection with the requested configuration change, such as more fully described herein. The translator component 202 can employ the configuration generation tool to translate the policies into immutable configuration data 304 (e.g., an immutable configuration message or file comprising the immutable configuration data), in the desired format and protocol, wherein the immutable configuration data 304 can correspond to the set of policies (e.g., the immutable configuration data 304 can specify that a configuration change for mirroring data traffic of the virtual service to send the data traffic to another entity is denied). In some embodiments, the translator component 202 can generate the immutable configuration data 304 in a JSON format using a corresponding JSON protocol. In other embodiments, another desired type of format and protocol can be used to generate immutable configuration data associated with a service container.

The AMC 166 can communicate the immutable configuration data associated with each service container (e.g., 128, 130, 132, or 134) to the service proxy (e.g., 154, 156, 158, or 160) associated with that service container. For instance, using a desired secure bootstrap process, and via a secure (e.g., encrypted) communication channel, the AMC 166 can communicate the immutable configuration data associated with each service container (e.g., 128, 130, 132, or 134), other boot-up data, and/or other desired data to the corresponding service proxy (e.g., 154, 156, 158, or 160).

Figure 4:
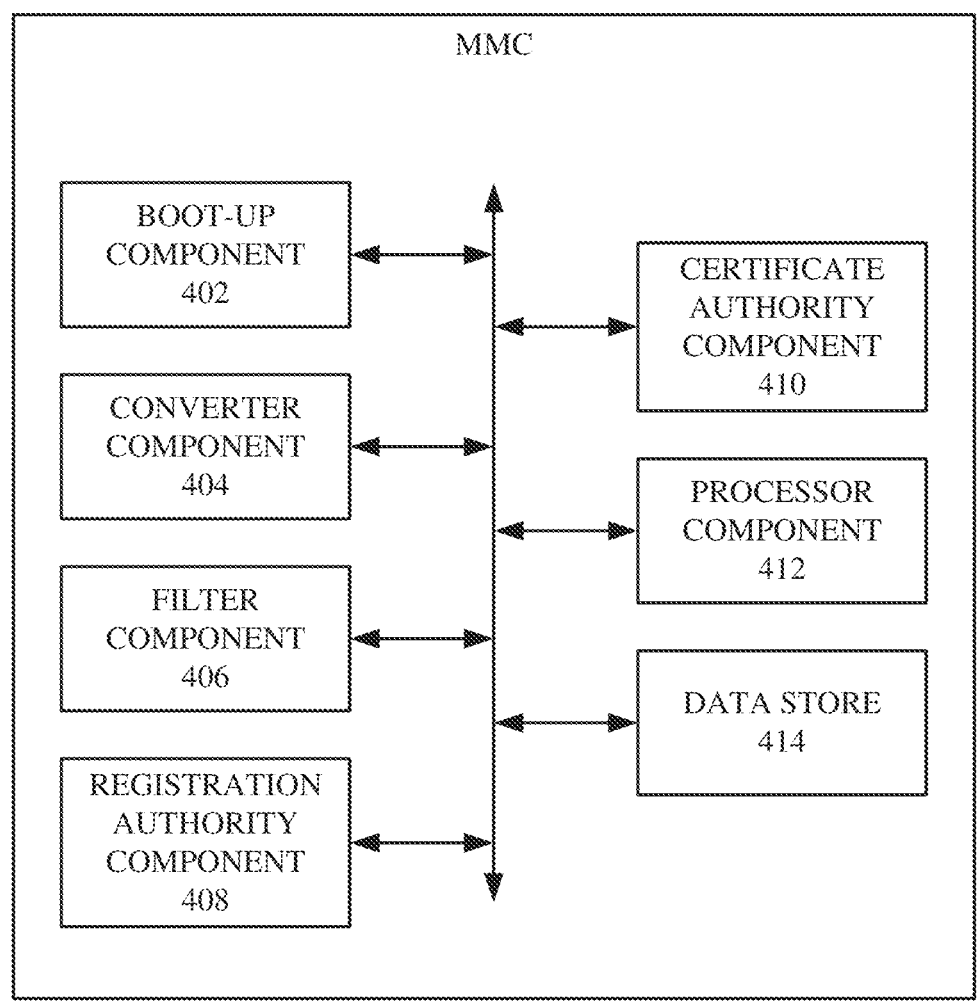
FIG. 4 depicts a block diagram of an example, non-limiting message management component, in accordance with various aspects and embodiments of the disclosed subject matter.

Referring to FIG. 4 (along with FIGS. 1-3), FIG. 4 depicts a diagram of an example, non-limiting MMC 170, in accordance with various aspects and embodiments of the disclosed subject matter. The MMCs 168, 172, and/or 174 can be the same as or similar to the MMC 170, and same or similar operations and functions described herein with regard to the MMC 170 can be performed, executed, or implemented by MMCs 168, 172, and/or 174. The MMC 170 of a service proxy (e.g., 156) associated with a service container (e.g., 130) can receive the immutable configuration data associated with that service container, the other boot-up data, and/or the other desired data from the AMC 166. The MMC 170 can comprise a boot-up component 402 that can securely boot up or initialize the service container (e.g., 130) and service proxy (e.g., 156) based on the immutable configuration data and/or the other boot-up data.

Figure 5:
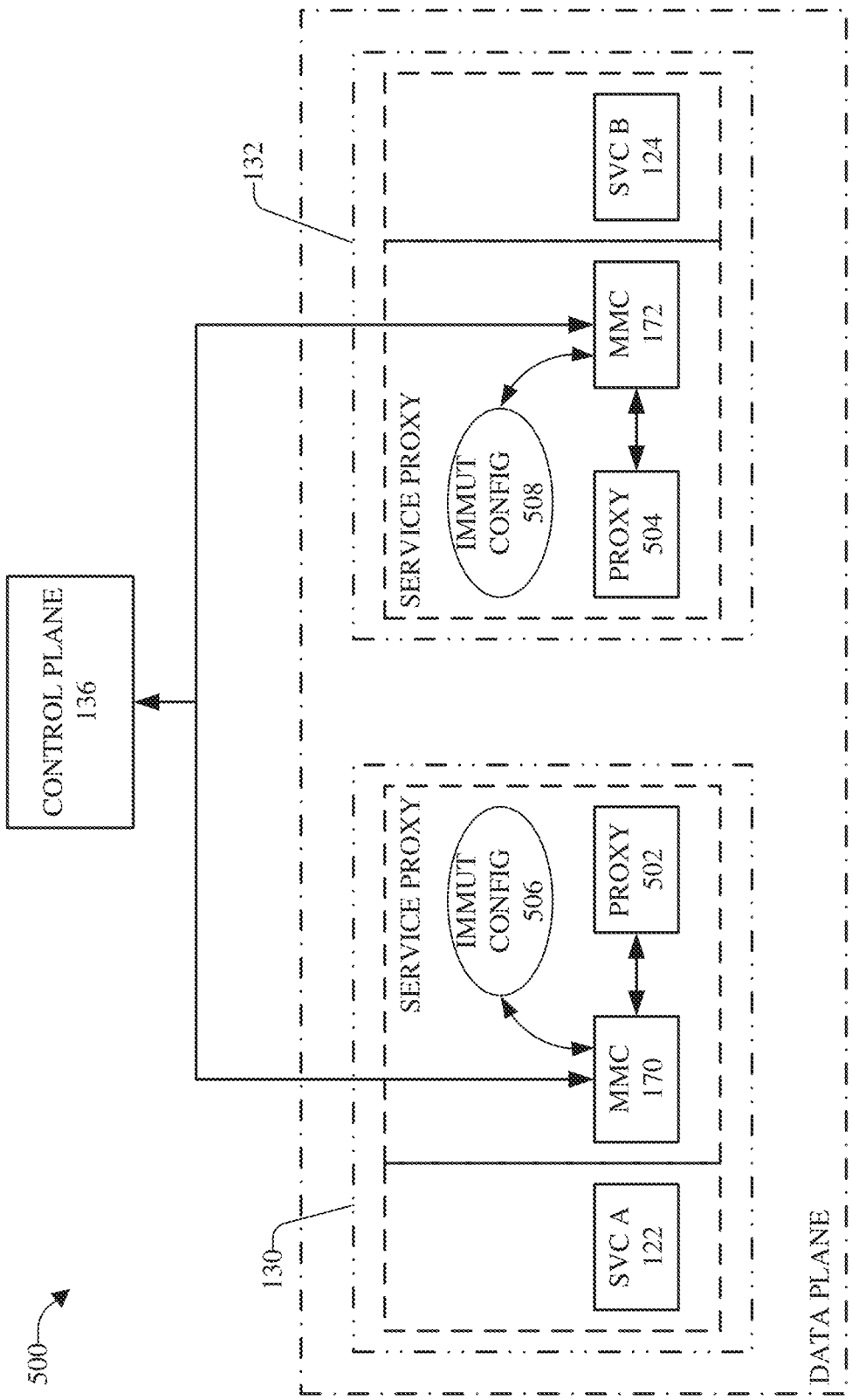
FIG. 5 illustrates a block diagram of an example, non-limiting subsystem relating to certain services, in accordance with various aspects and embodiments of the disclosed subject matter.

Referring to FIG. 5 (along with FIGS. 1-4), FIG. 5 illustrates a block diagram of an example, non-limiting subsystem 500 that can be part of the system 100, in accordance with various aspects and embodiments of the disclosed subject matter. The subsystem 500 can comprise the control plane 136, service A 122, service B 124, service proxy 156, service proxy 158, MMC 170, and MMC 172. The service proxy 156 can comprise a proxy 502, and the service proxy 158 can comprise a proxy 504, wherein the proxies 502 and 504 can process data, perform configuration changes (when permitted), and/or perform other desired operations. The MMC 170 can reside between the control plane 136 and the proxy 502, and can be under the control of the service proxy 156 and/or application image builder; and, similarly, the MMC 172 can reside between the control plane 136 and the proxy 504, and can be under the control of the service proxy 158 and/or application image builder.

At various times, the control plane 136 can receive various types of messages from various entities, including, for example, a cluster or cloud administrator (or other entity acting on behalf of the administrator), another third-party entity, or the service mesh system (e.g., components of the service mesh 112). Some or all of these entities may be untrusted, or at least partially untrusted, by the application 126 and application owner. Some of these messages can be directed to service proxies and can comprise requests for configuration changes associated with service containers and/or other information, and other messages may not include requests for configuration changes associated with service containers. When the control plane receives a particular message from such an entity, the control plane 136 can analyze the particular message and can convert the information in the particular message into a desired format (e.g., gRPC or other desired format) to generate a message that can be sent to the intended destination (e.g., to the intended service proxy (e.g., 156) or other component). The content of the message generated by the control plane 136 can correspond to the content of the particular message sent by the entity, but can be in the desired format that can be understood by the intended message recipient (e.g., service proxy).

When a particular message sent by an entity is directed to the service proxy 156, the control plane 136 can generate a corresponding message in the desired format, such as described herein. The control plane 136 can communicate the message to the service proxy 156 via a secure communication channel. The MMC 170 of the service proxy 156 can receive the message. The MMC 170 can comprise a converter component 404 that can unmarshal or decode the information in the message and/or can convert the information in the message from the format (e.g., gRPC) it was in to a desired format (e.g., JSON format) of the service proxy 156. The converter component 404 can store the information of the message, in the desired format, in a desired document (e.g., JSON document) or database. The MMC 170 also can desirably handle or manage recurring subtypes.

The MMC 170 can analyze the information in the message, in part, to facilitate determining whether the message information comprises any requests for configuration changes associated with the service container 130. Based on the analysis of the information in the message, the MMC 170 can determine whether the message comprises one or more requests for configuration changes associated with the service container 130, or contains no request for a configuration change. If the MMC 170 determines that the message does not contain a request for a configuration change associated with the service container 130, the MMC 170 can determine that the information in the message can be processed by the proxy 502. In such instance, the MMC 170 can forward the message information to the proxy 502 for processing or implementation.

If, instead, the MMC 170 determines that the message comprises one or more requests for configuration changes associated with the service container 130, with regard to each configuration change request, the MMC 170, employing a filter component 406, can determine whether each requested configuration change is allowed based on an analysis of the requested configuration change and the immutable configuration data 506 (IMMUT CONFIG) associated with the service container 130. For instance, with regard to each configuration change request, the filter component 406 can compare the requested configuration change associated with the service container 130 with the immutable configuration data 506 to determine whether the immutable configuration data 506 indicates that such requested configuration change is not allowed (e.g., is denied, or is not permitted or authorized). Based at least in part on the result of the comparison, the filter component 406 can determine whether the requested configuration change is allowed.

If the filter component 406 determines that such requested configuration change is allowed (e.g., based on the immutable configuration data 506 not indicating that the requested configuration change is immutable or denied), the filter component 406 can forward (e.g., communicate or send) information relating to the requested configuration change to the proxy 502 for processing and implementation. The proxy 502 can perform or implement such requested configuration change, which can result in a modification of an interaction between the application 126 (e.g., components associated with the application, such as the VM 116, service container 130, service proxy 156, service A 112, or other component associated with the application) and the service mesh 112.

If, instead, with regard to each configuration change request, the filter component 406 determines that such requested configuration change is not allowed (e.g., based on the immutable configuration data 506 indicating that the requested configuration change is immutable or denied), the filter component 406 can filter out and/or deny the request for the configuration change, and can discard or delete such configuration change request, which can thereby prevent the undesired (e.g., denied) configuration change from being processed or implemented by the proxy 502.

Figure 6:
FIG. 6 illustrates a diagram of a non-limiting example request for a configuration change, in accordance with various aspects and embodiments of the disclosed subject matter.

To illustrate, referring briefly to FIG. 6 (along with FIGS. 1-5), FIG. 6 illustrates a diagram of a non-limiting example request for a configuration change 600, in accordance with various aspects and embodiments of the disclosed subject matter. The example request for the configuration change 600 can present non-limiting example pseudocode relating to the request for the configuration change. As depicted in the example request for a configuration change 600, the request for the configuration change 600 is requesting a configuration change for mirroring of data traffic for httpbin, version 1 (v1) to have the data traffic sent to another entity, httpbin, version 2 (v2). The filter component 406 can analyze the request for configuration change 600. Based on the analysis, the filter component 406 can identify various items of information, such as, for example, the configuration change request relates to "virtual hosts" 602, and involves "routes," "action," "Route" 604, with regard to a "Cluster Specifier" specifying the "Cluster" relating to httpbin, v1 (606), and requests mirror policies 608 relating to "cluster" with regard to httpbin, v2 (610) to request mirroring of the data traffic associated with httpbin, v1 to have such data traffic sent to httpbin, v2.

The filter component 406 can compare the immutable configuration data 304 of FIG. 3 (corresponding to immutable configuration data 506 of FIG. 5) to the information identified (e.g., items of information 602, 604, 606, 608, and/or 610) in the request for the configuration change 600. Based at least in part on the result of such comparison, the filter component 406 can determine that the request for the configuration change 600 is not allowed (e.g., denied), since information of the configuration change request 600 can be found in the immutable configuration data and the immutable configuration data indicates or specifies that such configuration change request 600 is to be denied. Accordingly, the filter component 406 can filter out and/or deny the request for the configuration change 600, and can discard or delete the request for the configuration change 600, which can thereby prevent this undesired configuration change from being processed or implemented by the proxy 502.

It is to be appreciated and understood that the MMC 172 (and other MMCs disclosed herein) can perform same or similar analysis and operations as the MMC 170 with regard to processing of messages and determining whether configuration change requests associated with the service container 132 and service proxy 158 are to be processed and/or implemented based on analysis of the immutable configuration data 508 that can be provided to the service proxy 158 by the AMC 166, such as more fully described herein.

With further regard to FIGS. 1-5, in some embodiments, in addition to, or as an alternative to, the application owner setting policies that indicate whether a configuration change is immutable, the application owner can set one or more policies relating to configuration changes associated with a service container (e.g., 128, 130, 132, or 134) that can render requests for the one or more types of configuration changes conditionally immutable (e.g., conditionally denied) in that they can be denied unless the requestor entity that is requesting the configuration change provides verified approval (e.g., a verified signature) of the application owner that indicates the application owner has approved or authorized the requested configuration change. For instance, the immutable configuration associated with a service container (e.g., 128, 130, 132, or 134) can be defined (e.g., by the application owner and/or AMC 166 based on the policies set by the application owner) as the set of configuration settings that have to be signed by the application owner (e.g., that have to have verified signature approval of the application owner) in order to be applied to the service proxy (e.g., 154, 156, 158, or 160) associated with that service container. For example, if desired by the application owner, the immutable configuration associated with a service container (e.g., 128, 130, 132, or 134) and associated service proxy (e.g., 154, 156, 158, or 160) can specify or indicate that all mirroring policies have to have verified signature approval of the application owner in order to be authorized and applied to the service proxy (e.g., 154, 156, 158, or 160).

Figure 7:
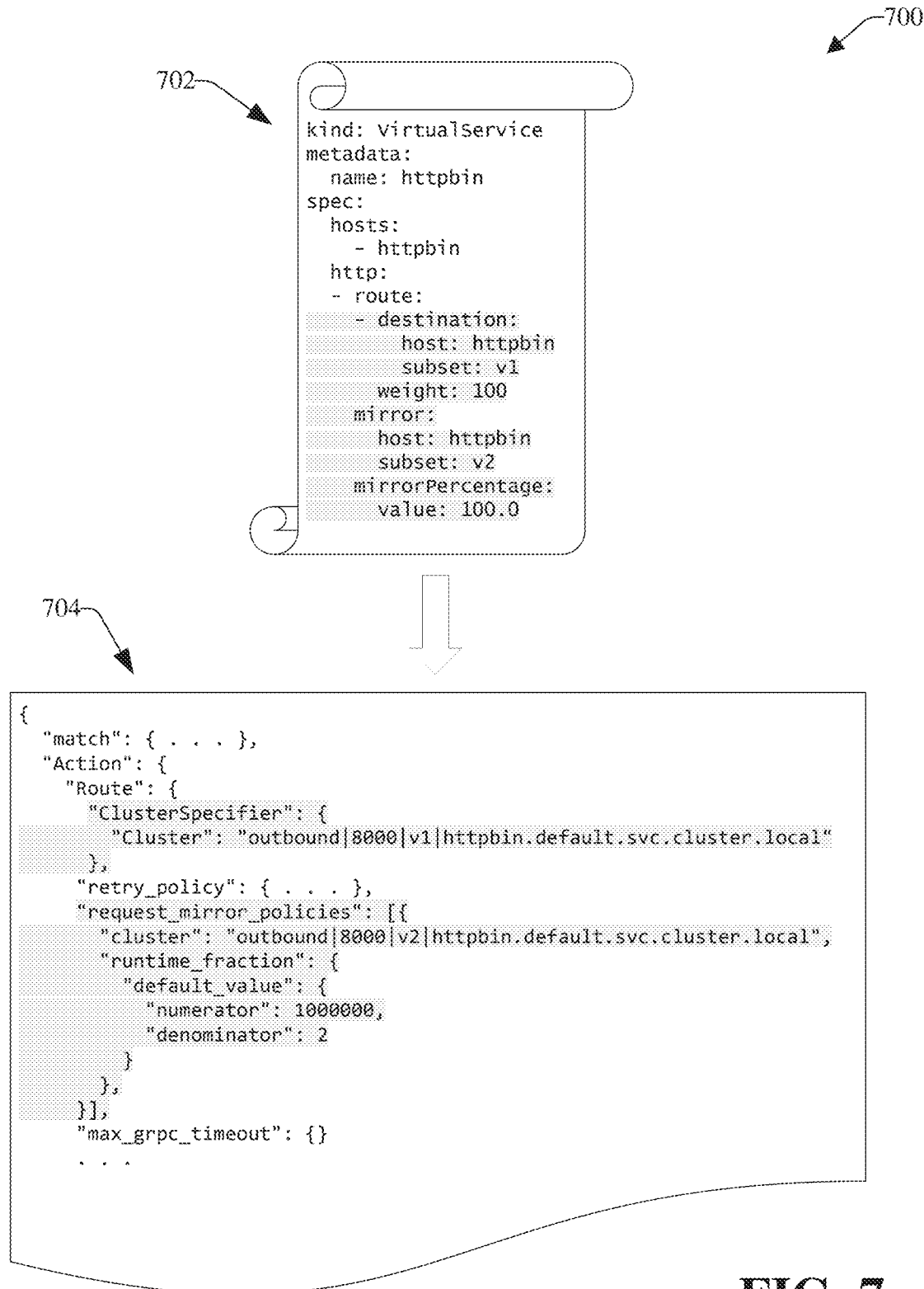
FIG. 7 presents a diagram of a non-limiting example immutable configuration data generation flow relating to custom resource definitions (CRDs) and signature verification, in accordance with various aspects and embodiments of the disclosed subject matter.

In certain embodiments, the application owner can define the service proxy configuration (e.g., sidecar proxy configuration) for a service proxy (e.g., 154, 156, 158, or 160) through custom resource definitions (CRDs). In that regard, as an example, referring briefly to FIG. 7 (along with FIGS. 1-5), FIG. 7 presents a diagram of a non-limiting example immutable configuration data generation flow 700 relating to CRDs and signature verification, in accordance with various aspects and embodiments of the disclosed subject matter. The example immutable configuration data generation flow 700 can present non-limiting example pseudocode relating to immutable configurations that can involve CRDs and signature verification. In accordance with the example immutable configuration data generation flow 700, the application owner can define the service proxy configuration for a service proxy (e.g., 156) through CRDs 702 that can indicate that mirroring policies to mirror data traffic for httpbin, v1, to have the data traffic sent to another entity, httpbin, v2, have to have verified signature approval of the application owner in order to be authorized and applied to the service proxy (e.g., 156).

The translator component 202 of FIG. 2 can employ the configuration generation tool to translate the CRDs 702 of the service proxy configuration to generate messages, such as example message 704, using a desired format and protocol (e.g., xDS API messages, or messages using another desired format and protocol). In some embodiments, the information in such messages can be in a JSON format. The translator component 202 also can utilize the configuration generation tool to detect or identify any policies that are in the immutable configuration. A signature component 204 (e.g., employing the configuration generation tool) can sign the contents of the immutable configuration policies. In this non-limiting example case, the immutable configuration policies (e.g., as represented by immutable configuration data) can comprise the mirroring policies, such as described herein.

Figure 8:
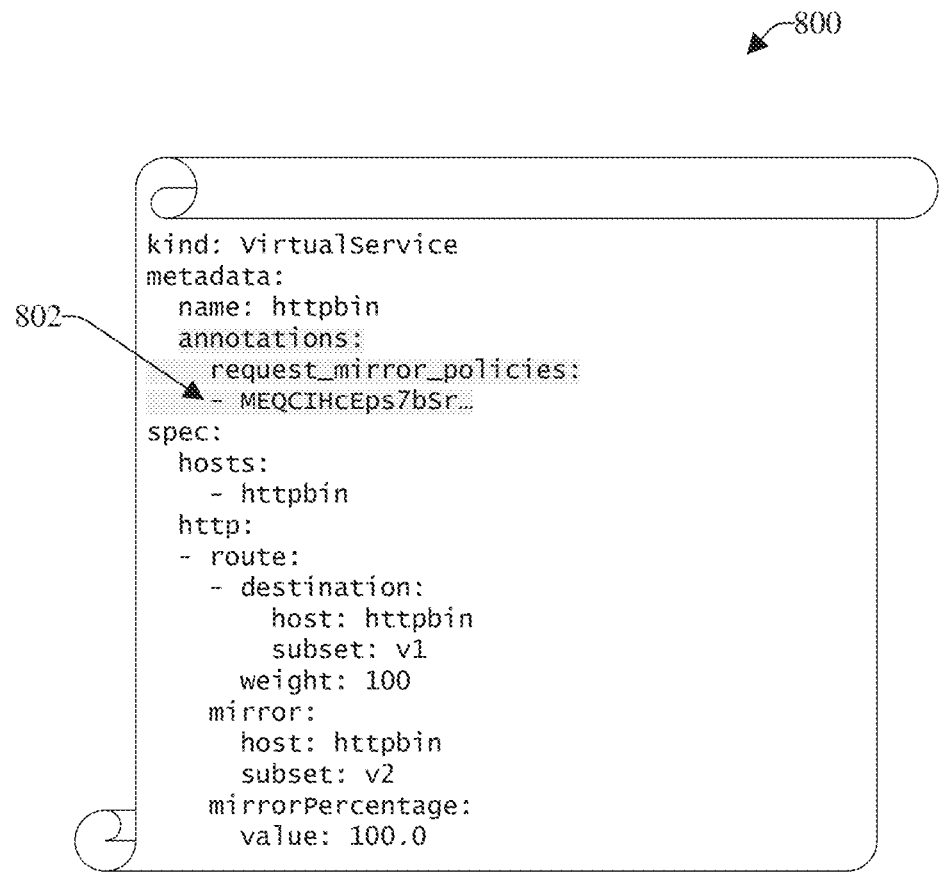
FIG. 8 depicts a diagram of a non-limiting example signed CRD relating to the example service proxy configuration, in accordance with various aspects and embodiments of the disclosed subject matter.

Referring briefly to FIG. 8 (along with FIGS. 1-5 and 7), FIG. 8 depicts a diagram of a non-limiting example signed CRD 800 relating to the example service proxy configuration, in accordance with various aspects and embodiments of the disclosed subject matter. In some embodiments, after the translator component 202, employing the configuration generation tool, signs the contents of the immutable configuration policies, the application owner can add the signature (e.g., encrypted digital signature), which was generated by the configuration generation tool, to the CRD (e.g., CRD 702 of FIG. 7) to create the signed CRD 800 comprising the signature 802 associated with requests relating to mirror policies.

Figure 9:
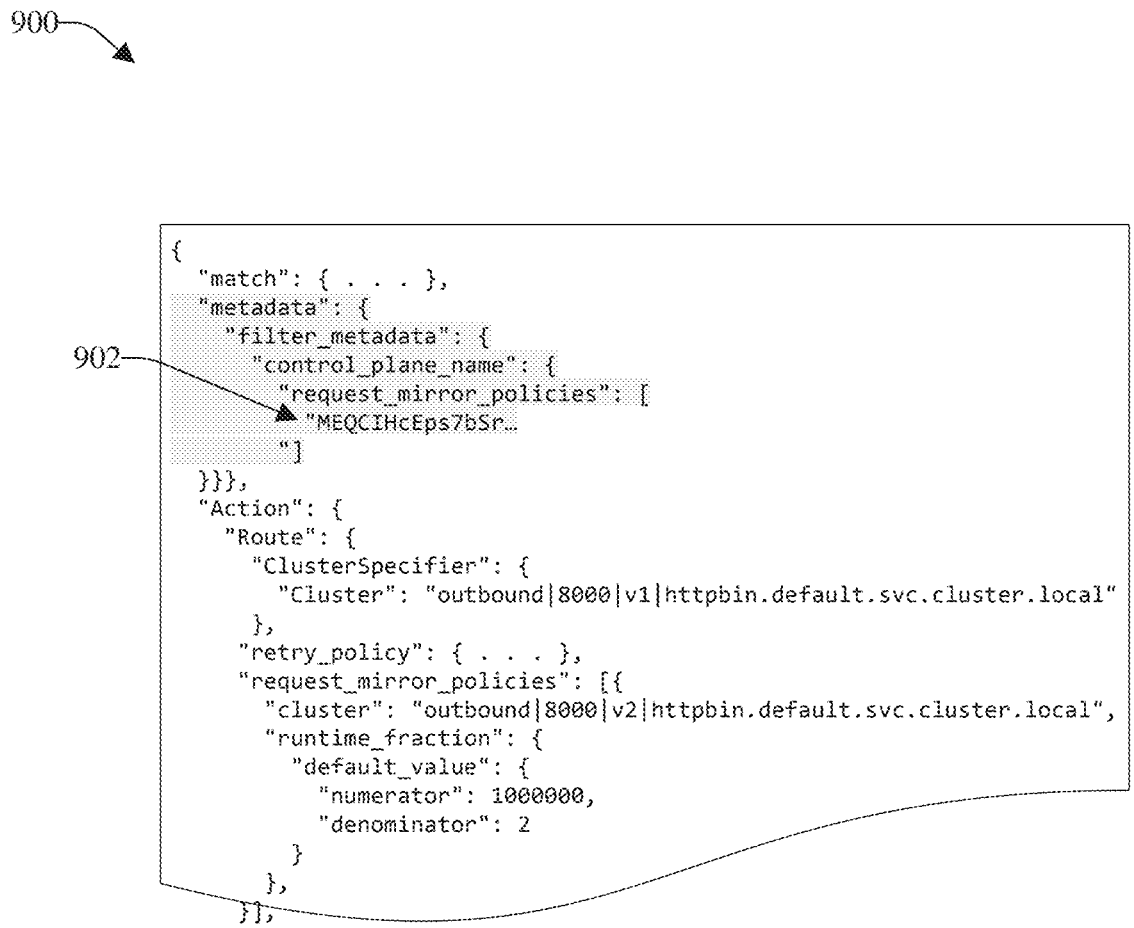
FIG. 9 illustrates a diagram of a non-limiting example resources definition comprising the signature associated with the application owner and relating to requests relating to mirror policies, in accordance with various aspects and embodiments of the disclosed subject matter.

In some embodiments, the control plane 136 can be enhanced (e.g., improved) to include the signature (e.g., signature corresponding to the signature generated by the configuration generation tool and the signature 802 applied to the CRD to create the signed CRD 800) in the definition of the resources that can be sent to the service proxies (e.g., 154, 156, 158, or 160) in the data plane of the service mesh 112. In that regard, as an example, turning briefly to FIG. 9 (along with FIGS. 1-5, 7, and 8), FIG. 9 illustrates a diagram of a non-limiting example resources definition 900 comprising the signature 902 associated with the application owner and relating to requests relating to mirror policies, in accordance with various aspects and embodiments of the disclosed subject matter.

With regard to the MMC 170 of the service proxy 156 (but also similarly applicable to the other MMCs 168, 172, and 174 of the other service proxies), the MMC 170 of the service proxy 156 can receive the immutable configuration data associated with the service proxy 156 and associated service container 130, the other boot-up data, the public key of the application owner, and/or the other desired data from the AMC 166. The boot-up component 402 of the MMC 170 can securely boot up or initialize the service container (e.g., 130) and service proxy (e.g., 156) based on the immutable configuration data and/or the other boot-up data. The MMC 170 can thereby have access to the public key of the application owner, which can correspond to a secret (e.g., confidential) key that was utilized to generate the signature associated with the application owner, wherein the public key can correspond to the secret key to facilitate verification of the signature, when desired in connection with applicable configuration change or resource requests received from entities (e.g., third-party and/or untrusted entities).

As described herein, at various times, the control plane 136 can receive various types of messages from various entities (e.g., cluster or cloud administrator, another third-party entity, or the service mesh system). When the control plane receives a particular message from such an entity, the control plane 136 can analyze the particular message and can convert the information in the particular message into a desired format (e.g., gRPC or other desired format) to generate a message that can be sent to the intended destination (e.g., to the intended service proxy (e.g., 156) or other component). The content of the message generated by the control plane 136 can correspond to the content of the particular message sent by the entity, but can be in the desired format that can be understood by the intended message recipient (e.g., service proxy). If the particular message from the entity comprised a signature in connection with a configuration change or resource request, the control plane 136 can include that signature in the definition of the resources in the message generated by the control plane 136. For example, the control plane 136 can include that signature in the resource data structure in the message.

The control plane 136 can communicate the message to the service proxy 156 via a secure communication channel. The MMC 170, employing the converter component 404, can unmarshal or decode the information in the message and/or can convert the information in the message from the format (e.g., gRPC) it was in to a desired format (e.g., JSON format) of the service proxy 156, in part, to generate a desired representation (e.g., JSON representation) of the resources. The converter component 404 can store the information of the message, in the desired format, in a desired document (e.g., JSON document) or database.

The MMC 170 can analyze the information in the message, in part, to facilitate determining whether the message information comprises any resources or configuration change requests associated with the service container 130 that have to have a signature verification in order to be approved or are immutable configurations. Based on the analysis of the information in the message, the MMC 170 can determine whether the message comprises any resources or configuration change requests associated with the service container 130 that have to have a signature verification in order to be approved or have to be checked to see if they are part of the immutable configurations, or contains no resources or configuration change requests that have to have a signature verification in order to be approved or have to be checked to see if they are part of the immutable configurations. If the MMC 170 determines that the message does not contain resources or configuration change requests that have to have a signature verification in order to be approved or have to be checked to see if they are part of the immutable configurations, the MMC 170 can determine that the information in the message can be processed by the proxy 502. In such instance, the MMC 170 can forward the message information to the proxy 502 for processing or implementation.

If, instead, the MMC 170 determines that the message comprises resources or configuration change requests that have to have a signature verification in order to be approved or have to be checked to see if they are part of the immutable configurations, with regard to each resource or configuration change request, the MMC 170, employing the filter component 406, can determine whether the resource or requested configuration change is allowed based on an analysis of the resource or requested configuration change and the immutable configuration data 506 associated with the service container 130. With regard to immutable configurations not involving a verified signature, the filter component 406 can determine whether the resource or requested configuration change is allowed or not based on whether the immutable configuration data 506 indicates that such resource or requested configuration change is immutable or not, such as more fully described herein.

With particular regard to a resource or requested configuration change that can potentially can involve signature verification, if the filter component 406 determines that the resource or requested configuration change has to have signature verification based on the results of analyzing the immutable configuration data 506 with respect to the resource or requested configuration change, the filter component 406 can determine whether a signature exists in the resource data structure of the message received from the control plane 136. If there is no signature in the resource data structure, the filter component 406 can determine that the resource or requested configuration change is to be denied, and can discard the information relating to the resource or requested configuration change, which can prevent the proxy 502 from processing or implementing the resource or requested configuration change.

If, instead, the filter component 406 detects or identifies a signature in the resource data structure, the filter component 406 can determine whether the signature can be verified based on the public key associated with the application owner. For instance, the filter component 406 can apply the public key to the signature information of the signature to determine whether the signature can be verified as being the verified signature associated with the application owner. The public key can decrypt the signature information when the public key is applied to the signature information to generate or reveal decrypted signature information.

If the filter component 406 determines that the signature cannot be verified based on the application to the signature information of the signature, the filter component 406 can determine that the resource or requested configuration change is to be denied, and can discard the information relating to the resource or requested configuration change, which can prevent the proxy 502 from processing or implementing the resource or requested configuration change.

If, instead, the filter component 406 determines that the signature can be verified based on the application to the signature information of the signature, the filter component 406 can determine that the resource or requested configuration change can be approved or allowed, as the immutable configuration data 506 can indicate that the verified signature can indicate that the resource or requested configuration change can be approved. If the filter component 406 determines that such resource or requested configuration change is allowed based on the verified signature, the filter component 406 can forward (e.g., communicate or send) information relating to the resource or requested configuration change to the proxy 502 for processing and implementation. The proxy 502 can perform or implement such resource or requested configuration change. In some instances, this can result in a modification (e.g., change or alteration) of interaction between the application 126 (e.g., components associated with the application, such as the VM 116, service container 130, service proxy 156, service A 112, or other component associated with the application) and the service mesh 112.

Figure 10:
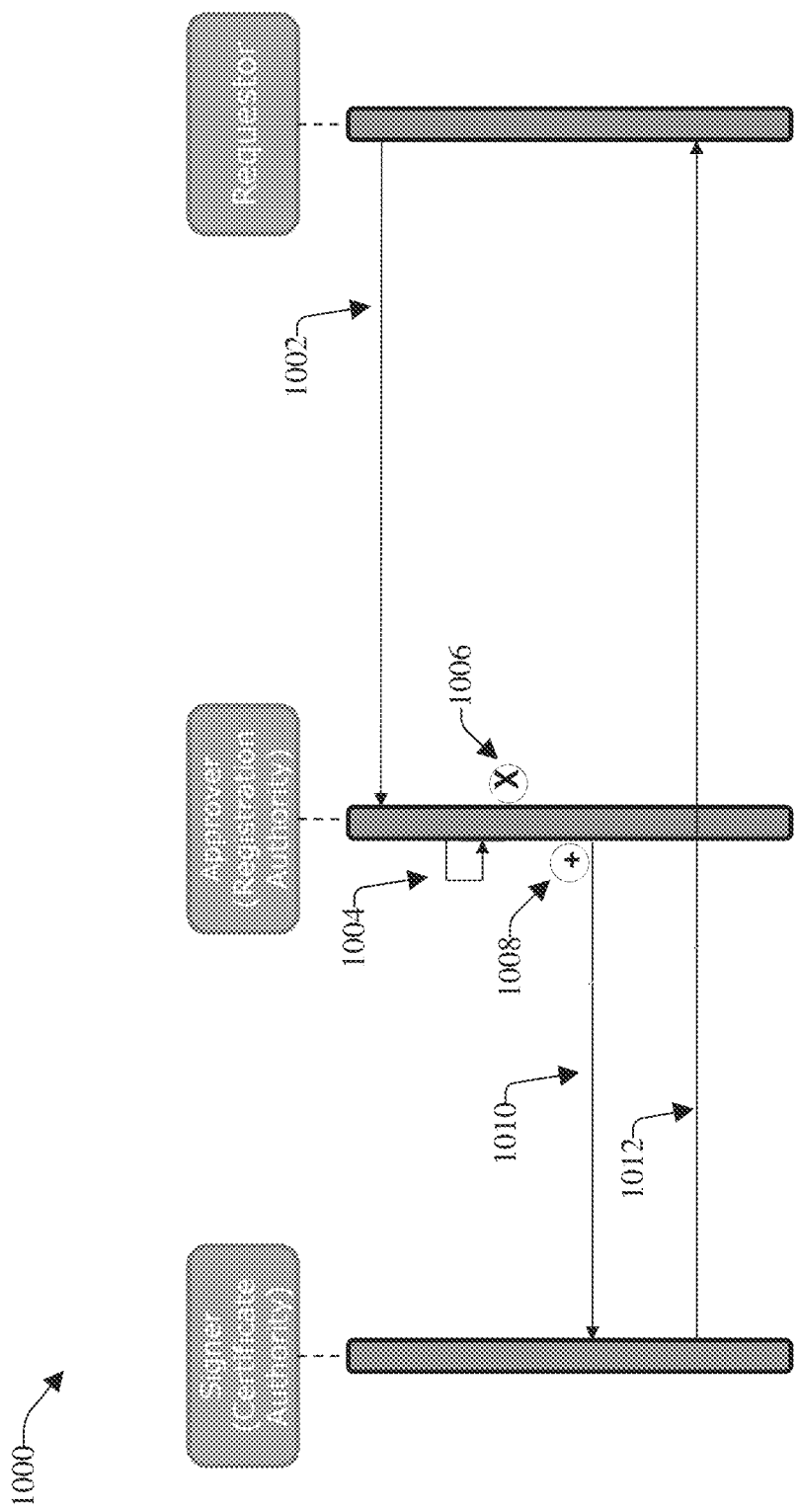
FIG. 10 depicts a diagram of a non-limiting example custom certificate authority flow that can be employed to facilitate securing components associated with an application by preventing unauthorized entities from being added and interacted with in connection with the application, in accordance with various aspects and embodiments of the disclosed subject matter.

Turning to FIG. 10 (along with FIGS. 1, 2, and 4), FIG. 10 depicts a diagram of a non-limiting example custom certificate authority flow 1000 that can be employed to facilitate securing components associated with an application (e.g., application 126) by preventing unauthorized entities (e.g., unauthorized service proxies or other unauthorized entities) from being added and interacted with in connection with the application, in accordance with various aspects and embodiments of the disclosed subject matter. The AMC 166 can comprise a certificate management component 206 that can generate a secret token (e.g., encrypted token and/or secret key, which can be based on a common secret) associated with the application 126 and/or application owner. During the secure bootstrap process, the certificate management component 206 can communicate the secret token to a certificate requestor entity, such as, for example, a service proxy (e.g., 154, 156, 158, or 160) or other type of entity (e.g., component of the service mesh 112) that can be a certificate requestor entity (e.g., at some point in time) along with (or as part of) the immutable configuration data, other boot-up data, and/or other desired data. The requestor entity (e.g., service proxy) typically only can accept certificates issued by the custom certificate authority.

In some embodiments, an MMC (e.g., 168, 170, 172, or 174) can comprise various components, such as, a registration authority component 408 and certificate authority component 410, that can perform various operations as part of the custom certificate authority flow 1000. As indicated at reference numeral 1002 of the custom certificate authority flow 1000, a requestor entity (e.g., service proxy 158) can communicate a CSR to a service proxy (e.g., 156) associated with a service container (e.g., 130) of the service mesh 112. The registration authority component 408 (e.g., the approver) of the MMC of the service proxy can receive the CSR from the requestor entity. The requestor entity can be a component, device, or another type of entity desiring to be added to be able to interact with components associated with the application (e.g., an entity desiring to be added to be able to communicate or interact with one or more service proxies associated with the application and in the application trust domain).

As indicated at reference numeral 1004, the registration authority component 408 can perform an authorization check on the CSR to determine whether the CSR can be approved. For instance, the registration authority component 408 can analyze the CSR to determine whether the CSR contains a secret token associated with the application 126. The registration authority component 408 can perform such an authorization check on the CSR as it can be desirable (e.g., wanted or required) for there to be authentication for certificate requests from specific trust domains. If the requestor entity (e.g., service proxy 158) is permitted to be an authorized entity authorized to be added with respective to the application 126 (e.g., authorized to be added to the application trust domain associated with the application 126), the application owner can authorize the inclusion of the secret token in the immutable configuration data associated with the requestor entity to enable the requestor entity to authenticate with another entity (e.g., an authorized service proxy) associated with the application. The requestor entity can include the secret token in the CSR sent to the registration authority component 408.

As indicated at reference numeral 1006, if, based on the analysis of the CSR, the registration authority component 408 determines that the CSR does not contain the secret token associated with the application or otherwise cannot verify (e.g., validate) a token in the CSR, the registration authority component 408 can determine that the requestor entity is not authenticated and is not authorized to be added in connection with the application, and can deny the CSR.

As indicated at reference numeral 1008, if, instead, based on the analysis of the CSR indicating that the CSR does contain the secret token, the registration authority component 408 determines that the CSR is authorized, the registration authority component 408 can determine that the requestor entity is authenticated and authorized to be added for use in connection with the application, and can approve the CSR. As indicated at reference numeral 1010, in response to approving the CSR entity, the registration authority component 408 can generate a CSR approval message that can indicate that the CSR has been approved, and can communicate the CSR approval message to the certificate authority component 410.

As indicated at reference numeral 1012, in response to receiving the CSR approval message, the certificate authority component 410 can sign the certificate to generate the signed certificate, and can communicate the signed certificate to the requestor entity. The signed certificate can indicate that the requestor entity is authorized in connection with the application 126 (e.g., the requestor entity is authorized to be added to the application trust domain associated with the application 126 and to communicate with another service proxy(ies) associated with the application trust domain). Once added to the application trust domain, the requestor entity can communicate or interact with (e.g., exchange data with) the service proxy(ies) associated with the application trust domain associated with the application 126.

With further regard to the AMC 166, the AMC 166 also can comprise or be associated with a processor component 208 and a data store 210 that can be associated with (e.g., communicatively connected to) the translator component 202, signature component 204, and/or the certificate management component 206. The processor component 208 can work in conjunction with the other components (e.g., translator component 202, signature component 204, certificate management component 206, data store 210, and/or other component) to facilitate performing the various functions of the AMC 166. The processor component 208 can employ one or more processors, microprocessors, or controllers that can process data, such as information relating to applications, immutable configuration data, policies, rules, components of or associated with an application, defined message processing or change request processing criteria, algorithms (e.g., defined message processing algorithms, defined configuration change request processing algorithms, or other algorithms, as represented in the methods, flows, or techniques described herein), traffic flows, protocols, interfaces, tools, and/or other information, to facilitate operation of the AMC 166, as more fully disclosed herein, and control data flow between the AMC 166 and other components (e.g., service mesh, service proxies, control plane, APIs, computer, laptop computer, other computing or communication device, or other device or component) associated with (e.g., connected to) the AMC 166.

The data store 210 can store data structures (e.g., user data, metadata), code structure(s) (e.g., modules, objects, hashes, classes, procedures) or instructions, information relating to applications, immutable configuration data, policies, rules, components of or associated with an application, defined message processing or change request processing criteria, algorithms (e.g., defined message processing algorithms, defined configuration change request processing algorithms, or other algorithms, as represented in the methods, flows, or techniques described herein), traffic flows, protocols, interfaces, tools, and/or other information, to facilitate controlling operations associated with the AMC 166. In an aspect, the processor component 208 can be functionally coupled (e.g., through a memory bus) to the data store 210 in order to store and retrieve information desired to operate and/or confer functionality, at least in part, to the translator component 202, signature component 204, certificate management component 206, data store 210, and/or other component, and/or substantially any other operational aspects of the AMC 166.

With further regard to the MMC 170, the MMC 170 also can comprise or be associated with a processor component 412 and a data store 414 that can be associated with (e.g., communicatively connected to) the boot-up component 402, converter component 404, filter component 406, registration authority component 408, and/or certificate authority component 410. The processor component 412 can work in conjunction with the other components (e.g., boot-up component 402, converter component 404, filter component 406, registration authority component 408, certificate authority component 410, data store 414, and/or other component) to facilitate performing the various functions of the MMC 170. The processor component 412 can employ one or more processors, microprocessors, or controllers that can process data, such as information relating to applications, immutable configuration data, policies, rules, components of or associated with an application, defined message processing or change request processing criteria, algorithms (e.g., defined message processing algorithms, defined configuration change request processing algorithms, defined filtering algorithms, or other algorithms, as represented in the methods, flows, or techniques described herein), traffic flows, protocols, interfaces, tools, and/or other information, to facilitate operation of the MMC 170, as more fully disclosed herein, and control data flow between the MMC 170 and other components (e.g., service mesh, service proxies, control plane, APIs, computer, laptop computer, other computing or communication device, or other device or component) associated with (e.g., connected to) the MMC 170.

The data store 414 can store data structures (e.g., user data, metadata), code structure(s) (e.g., modules, objects, hashes, classes, procedures) or instructions, information relating to applications, immutable configuration data, policies, rules, components of or associated with an application, defined message processing or change request processing criteria, algorithms (e.g., defined message processing algorithms, defined configuration change request processing algorithms, defined filtering algorithms, or other algorithms, as represented in the methods, flows, or techniques described herein), traffic flows, protocols, interfaces, tools, and/or other information, to facilitate controlling operations associated with the MMC 170. In an aspect, the processor component 412 can be functionally coupled (e.g., through a memory bus) to the data store 414 in order to store and retrieve information desired to operate and/or confer functionality, at least in part, to the boot-up component 402, converter component 404, filter component 406, registration authority component 408, certificate authority component 410, data store 414, and/or other component, and/or substantially any other operational aspects of the MMC 170.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 11:
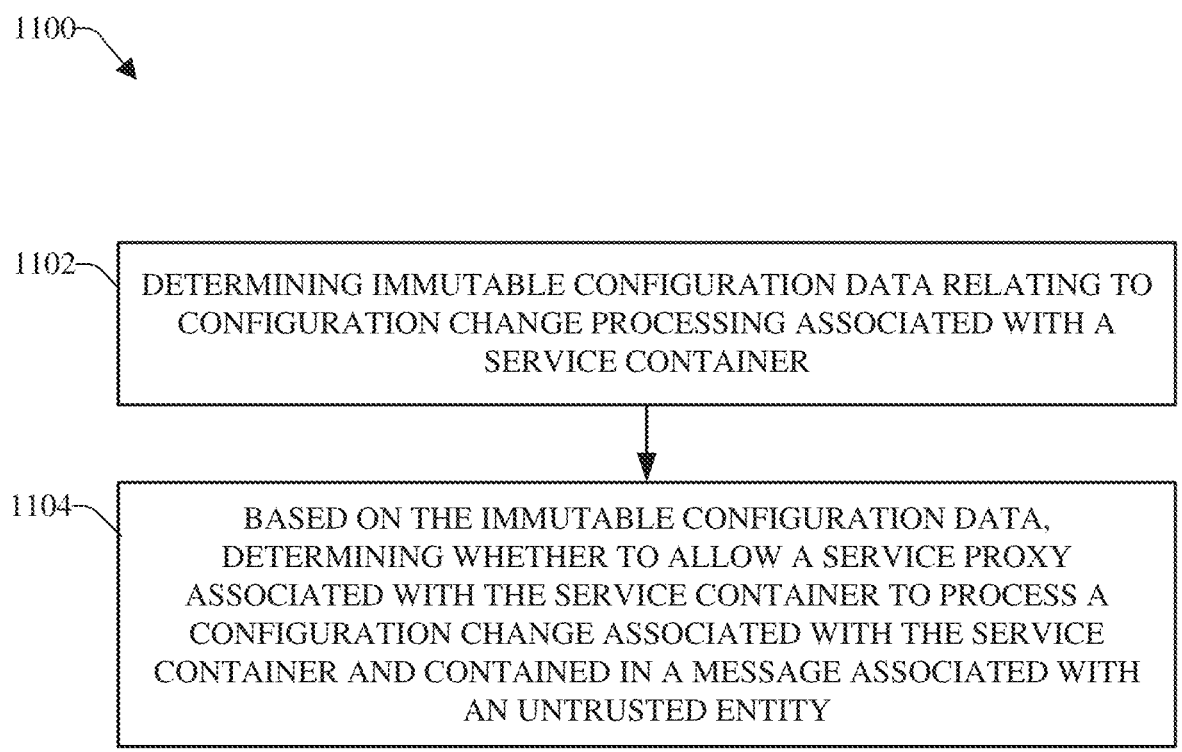
FIG. 11 illustrates a flow diagram of an example, non-limiting method that can securely manage processing of configuration changes associated with a service container associated with a service mesh and an application, in accordance with various aspects and embodiments of the disclosed subject matter.

FIG. 11 illustrates a flow diagram of an example, non-limiting method 1100 that can securely manage processing of configuration changes associated with a service container associated with a service mesh and an application, in accordance with various aspects and embodiments of the disclosed subject matter. The method 1100 can be performed by, for example, a system comprising or operatively coupled to an AMC, an MMC, a processor component, and/or a data store. Repetitive description of like elements employed in other embodiments described herein is or may be omitted for sake of brevity.

At 1102, immutable configuration data relating to configuration change processing associated with a service container can be determined. The AMC can determine the immutable configuration data relating to configuration change processing associated with the service container of the service mesh, and associated with an application, based on a set of policies relating to configuration changes that can be received from the application owner. The configuration changes can relate to interactions between the application and the service mesh, such as described herein.

At 1104, based on the immutable configuration data, a determination can be made regarding whether to allow a service proxy associated with the service container to process a configuration change associated with the service container and contained in a message associated with an untrusted entity. The MMC of or associated with the service proxy (e.g., sidecar proxy) can receive the message via the control plane. An initial message can be received by the control plane from an unknown entity, wherein the unknown entity can be, for example, a cluster administrator, someone acting on behalf of the cluster administrator, a service mesh entity, or another type of untrusted entity (e.g., an entity that can be untrusted with respect to the application, application owner, and/or service container). The MMC can analyze the message to determine whether the message comprises information that requests to have a configuration change made by the service proxy (e.g., by a proxy of the service proxy), wherein the configuration change can relate to an interaction between the application and the service mesh. If the message does comprise information requesting the configuration change, the MMC can analyze the immutable configuration data, and, based on the results of analyzing the immutable configuration data, the MMC can determine whether to allow the service proxy associated with the service container to process the configuration change.

In some embodiments, if the MMC determines that the requested configuration change is in the immutable configuration data (e.g., is thus prohibited by the immutable configuration data), the MMC can determine that the requested configuration change is not allowed and can perform a desired action (e.g., discard or delete configuration change information of the message and relating to the configuration change) to prevent the proxy from implementing the configuration change relating to the interaction between the application and the service mesh. If, instead, the MMC determines that the requested configuration change is not in the immutable configuration data (e.g., is not prohibited by the immutable configuration data), the MMC can determine that the requested configuration change is allowed and can communicate configuration change information of the message and relating to the configuration change to the proxy for processing to implement the configuration change relating to the interaction between the application and the service mesh.

In certain embodiments, the MMC can analyze the immutable configuration data to determine whether the immutable configuration data comprises a verified signature of the application owner indicating that the application owner approves of the requested configuration change. If the MMC determines the immutable configuration data does not contain a verified signature of the application owner indicating that the application owner approves of the requested configuration change and is thus prohibited by the immutable configuration data, the MMC can determine that the requested configuration change is not allowed and can perform a desired action (e.g., discard or delete the configuration change information) to prevent the proxy from implementing the configuration change. If, instead, the MMC determines that the immutable configuration data comprises the verified signature of the application owner indicating the application owner approves of the requested configuration change (and thus is permitted by the immutable configuration data), the MMC can determine the requested configuration change is allowed and can communicate the configuration change information relating to the configuration change to the proxy for processing to implement the configuration change.

Figure 12:
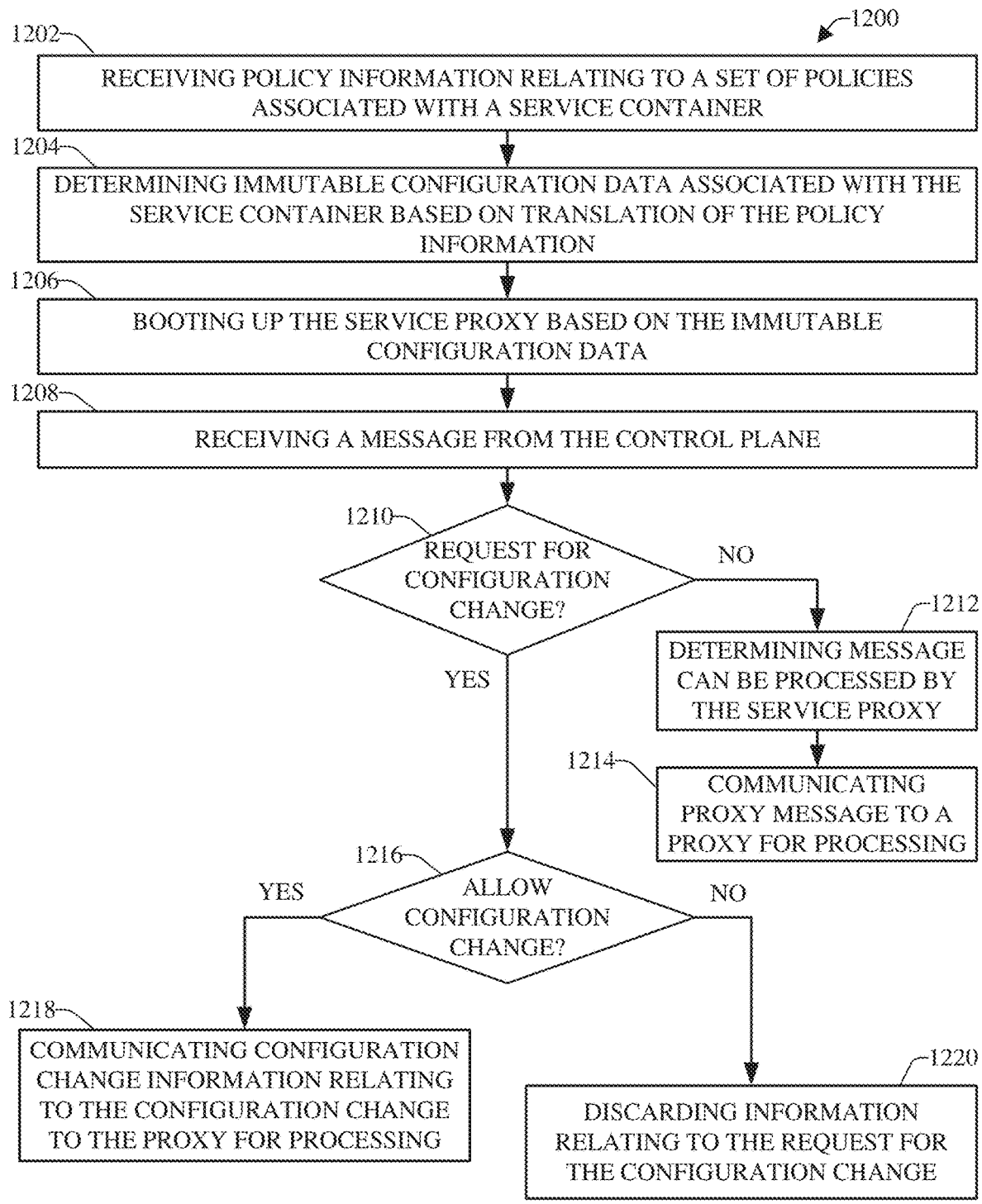
FIG. 12 depicts a flow diagram of another example, non-limiting method that can securely manage processing of configuration changes associated with a service container associated with a service mesh and an application, in accordance with various aspects and embodiments of the disclosed subject matter.

FIG. 12 depicts a flow diagram of another example, non-limiting method 1200 that can securely manage processing of configuration changes associated with a service container associated with a service mesh and an application, in accordance with various aspects and embodiments of the disclosed subject matter. The method 1200 can be performed by, for example, a system comprising or operatively coupled to an AMC, an MMC, a processor component, and/or a data store. Repetitive description of like elements employed in other embodiments described herein is or may be omitted for sake of brevity.

At 1202, policy information relating to a set of policies associated with a service container can be received. The AMC can receive the policy information from the application owner (or an authorized representative thereof) via an interface (e.g., API or user interface) or communication device associated with the application owner. The set of policies can define the immutable configuration associated with the service container of a service mesh associated with an application, as such immutable configuration can be desired by the application owner.

At 1204, immutable configuration data associated with the service container can be determined based on translation of the policy information. The AMC can analyze the policy information. Based on the analysis results, the AMC can translate the policy information to determine and generate the immutable configuration data associated with the service container. The immutable configuration data can be in a desired format and protocol that can be understood and utilized by the service proxy associated with the service container.

At 1206, the service proxy can boot up based on the immutable configuration data. The AMC can communicate the immutable configuration data and other data (e.g., other boot up data) desired for boot up and operation of the service proxy to the service proxy. At a desired time, the service proxy can boot up based on the immutable configuration data. In some embodiments, the MMC of the service proxy can boot up or facilitate booting up the service proxy based on the immutable configuration data and/or the other data.

At 1208, a message can be received from the control plane. The service proxy can receive the message from the control plane. The control plane can receive a certain message from an entity (e.g., an entity, such as a cluster administrator or other third-party entity, that may be untrusted with respect to the application, application owner, and/or service container), wherein the certain message can request a configuration change associated with the service container, or may not be requesting a configuration change associated with the service container. The control plane can generate the message, in a desired format (e.g., gRPC format or other desired format), based on (e.g., that can correspond to) the information in the certain message from the entity, wherein the desired format can be understood and utilized by the service proxy. If the certain message comprised the request for the configuration change associated with the service container, the message generated by the control plane can comprise information (e.g., in the desired format) relating to the request for the configuration change and/or other data (e.g., other data not requesting a configuration change and/or other data requesting another configuration change(s) associated with the service container).

At 1210, a determination can be made regarding whether the message comprises a request for a configuration change associated with the service container based on analysis of the message. The MMC can decode and analyze the message. Based on the analysis of the information in the message, the MMC can determine whether the message comprises a request for a configuration change associated with the service container.

If it is determined that the message does not comprise a request for a configuration change associated with the service container, at 1212, a determination can be made that the message can be processed by the service proxy. If the MMC determines that the message does not comprise a request for a configuration change associated with the service container, the MMC can determine that the message can be processed by the service proxy.

At 1214, a proxy message can be communicated to a proxy of the service proxy for processing. In response to determining that the message can be processed by the service proxy, the MMC can send a proxy message, comprising information obtained from the message (e.g., in a desired format, such as JSON format or another desired format), to the proxy of the service proxy. The proxy can process the information in the proxy message and perform operations, if any, based on the information in the proxy message.

Referring again to reference numeral 1210, if, instead, at 1210, it is determined that the message comprises a request for a configuration change associated with the service container, at 1216, with regard to each request for configuration change identified in the message, a determination can be made regarding whether to allow the service proxy to process the configuration change associated with the service container, based on analysis of the configuration change requested and the immutable configuration data. With regard to each of one or more requests for configuration changes identified in the message, the MMC can determine whether to allow the service proxy to process the configuration change associated with the service container, based on the results of the analysis of the configuration change requested and the immutable configuration data. The immutable configuration data can indicate which types of configuration changes, if any, are allowed (e.g., based on the set of policies provided by the application owner) and/or which type(s) of configuration change is associated with a verified signature of the application owner indicating that such type(s) of configuration change has been approved by the application owner and is therefore allowed.

With regard to each request for configuration change, if it is determined that the request for the configuration change is allowed based on the analysis of the configuration change requested and the immutable configuration data, at 1218, configuration change information relating to the configuration change can be communicated to the proxy for processing. With regard to each request for configuration change, if the MMC determines that the request for the configuration change is allowed based on the analysis results, the MMC can communicate the configuration change information relating to the configuration change to the proxy for processing and implementation by the proxy.

Referring again to reference numeral 1216, with regard to each request for configuration change, if it is determined that the request for the configuration change is not allowed based on the analysis of the configuration change requested and the immutable configuration data, at 1220, information relating to the request for the configuration change can be discarded. For instance, with regard to each request for configuration change associated with the message, if it is determined that the request for the configuration change is not allowed based on the analysis of the configuration change requested and the immutable configuration data, the MMC can discard the information relating to the request for the configuration change to facilitate preventing the proxy from processing the information relating to the request for the configuration change and implementing the change.

Figure 13:
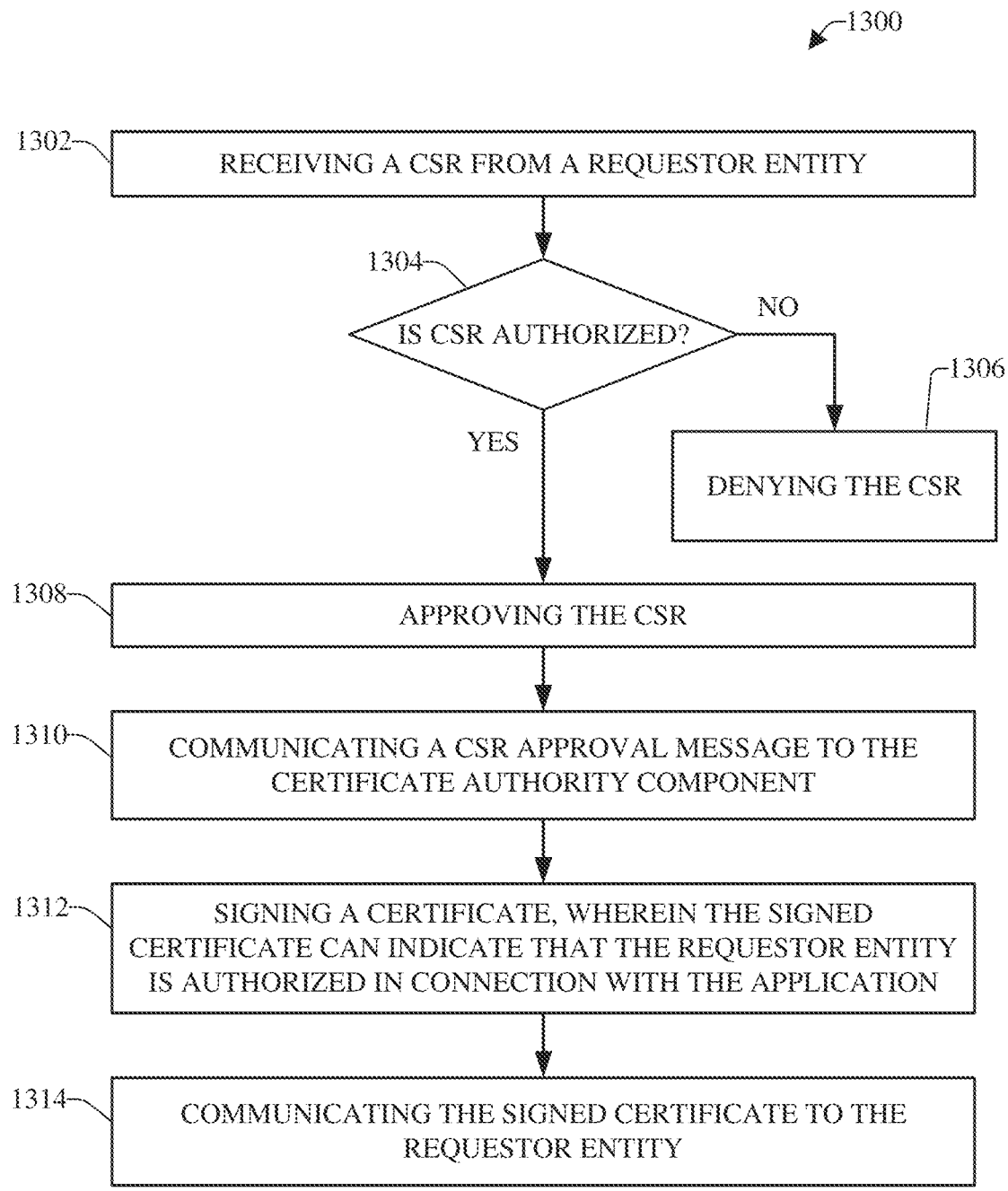
FIG. 13 illustrates a flow diagram of an example, non-limiting method that can securely manage adding of components or services in connection with an application associated with a service mesh, in accordance with various aspects and embodiments of the disclosed subject matter.

FIG. 13 illustrates a flow diagram of an example, non-limiting method 1300 that can securely manage adding of components or services in connection with an application associated with a service mesh, in accordance with various aspects and embodiments of the disclosed subject matter. The method 1300 can be performed by, for example, a system comprising or operatively coupled to an AMC, an MMC, a processor component, and/or a data store. Repetitive description of like elements employed in other embodiments described herein is or may be omitted for sake of brevity.

At 1302, a CSR can be received from a requestor entity. The application can be associated with the service mesh, which can comprise service containers (e.g., secure service containers) that can comprise or be associated with service proxies (e.g., sidecar proxies). The requestor entity can communicate the CSR to a service proxy associated with a service container of the service mesh. The registration authority component (e.g., the approver) of the MMC of the service proxy can receive the CSR from the requestor entity. The requestor entity can be a component or device, another service proxy associated with another service container, or another type of entity desiring to be added for use in connection with the application (e.g., desiring to be added to be able to communicate with one or more service proxies associated with the application and in the application trust domain).

At 1304, a determination can be made regarding whether the CSR is authorized based on analysis of the CSR. The registration authority component can analyze the CSR to determine whether the CSR contains a secret token (e.g., secret key) associated with the application. If the requestor entity is permitted to be an authorized entity authorized to be added for use in connection with the application, the application owner can authorize the inclusion of the secret token in the immutable configuration data associated with the requestor entity to enable the requestor entity to authenticate with another entity (e.g., an authorized service proxy) associated with the application. The secret token and/or other information (e.g., the immutable configuration data and/or other desired information, such as boot up data) can be communicated to the requestor entity during a secure bootstrap process (e.g., performed by the AMC or another component associated with the application). The requestor entity can include the secret token in the CSR sent to the registration authority component.

If it is determined that the CSR is not authorized based on the analysis of the CSR indicating that the CSR does not contain the secret token (e.g., the proper secret token), at 1306, the CSR can be denied. If the registration authority component determines that the CSR does not contain the secret token associated with the application based on the analysis of the CSR, the registration authority component can determine that the requestor entity is not authenticated and is not authorized to be added for use in connection with the application (e.g., is not authorized to exchange data with, or access or receive data from, the service container or service proxy).

Referring again to reference numeral 1304, if, instead, at 1304, it is determined that the CSR is authorized based on the analysis of the CSR indicating that the CSR does contain the secret token, at 1308, the CSR can be approved. If the registration authority component determines that the CSR does contain the secret token associated with the application based on the analysis of the CSR, the registration authority component can determine that the requestor entity is authenticated and is authorized to be added for use in connection with the application.

At 1310, a CSR approval message can be communicated to the certificate authority component. In response to approving the CSR associated with the requestor entity, the registration authority component can generate a CSR approval message that can indicate that the CSR has been approved, and can communicate the CSR approval message to the certificate authority component of the MMC.

At 1312, a certificate can be signed, wherein the signed certificate can indicate that the requestor entity is authorized in connection with the application. At 1314, the signed certificate can be communicated to the requestor entity. The certificate authority component can sign the certificate to generate the signed certificate, wherein the signed certificate can indicate that the requestor entity is authorized in connection with the application (e.g., the requestor entity is authorized to be added to the application trust domain associated with the application and to communicate with another service proxy (ies) associated with the application trust domain). The certificate authority component can communicate the signed certificate to the requestor entity. The requestor entity can utilize the certificate to facilitate authenticating with another service proxy associated with the application trust domain. For instance, the requestor entity can provide the signed certificate to a service proxy associated with the application trust domain to facilitate authenticating with the service proxy and being added to the application trust domain. Once added to the application trust domain, the requestor entity can communicate with (e.g., exchange data with) the service proxy (ies) associated with the application trust domain.

For simplicity of explanation, the methods and/or computer-implemented methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts can be required to implement the computer-implemented methods in accordance with the disclosed subject matter. In addition, those skilled in the art will understand and appreciate that the computer-implemented methods could alternatively be represented as a series of interrelated states via a state diagram or events. Additionally, it should be further appreciated that the computer-implemented methods disclosed hereinafter and throughout this specification are capable of being stored on an article of manufacture to facilitate transporting and transferring such computer-implemented methods to computers. The term article of manufacture, as used herein, is intended to encompass a computer program accessible from any computer-readable device or storage media.

Figure 14:
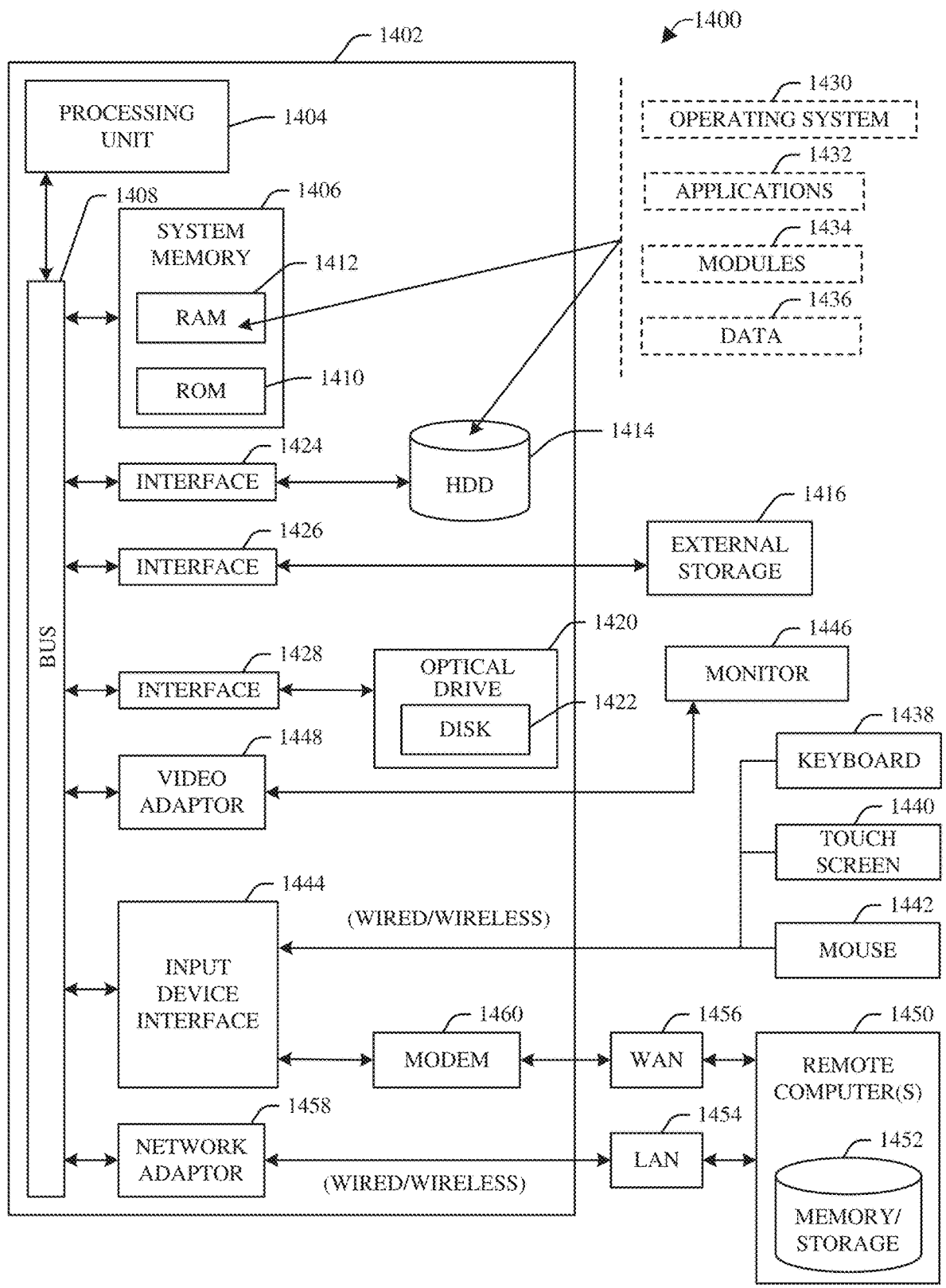
FIG. 14 illustrates a block diagram of an example, non-limiting operating environment in which one or more embodiments described herein can be facilitated.

In order to provide additional context for various embodiments described herein, FIG. 14 and the following discussion are intended to provide a general description of a suitable computing environment 1400 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as desktop computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically can include other peripheral output devices (not shown), such as speakers, printers, or other desired types of peripheral output devices.

The computer 1402 can operate in a networked environment using logical connections via wired and/or wireless communications to one or more remote computers, such as a remote computer(s) 1450. The remote computer(s) 1450 can be a workstation, a server computer, a router, a desktop computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN)

1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456, e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

One or more embodiments can be a system, a method, an apparatus and/or a computer program product at any possible technical detail level of integration. The computer program product can include a computer readable storage medium (or media) having computer readable program instructions thereon for causing a processor to carry out aspects of the one or more embodiments. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can include the following: a portable computer diskette, a hard disk, a RAM, a ROM, an erasable programmable read-only memory (EPROM or Flash memory), a SRAM, a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosed subject matter.

Aspects of disclosed subject matter are described herein with reference to flowchart illustrations and/or block diagrams of methods, apparatus (systems), and computer program products according to embodiments of the subject disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include ROM, PROM, EPROM, EEPROM, flash memory, or nonvolatile RAM (e.g., FeRAM). Volatile memory can include RAM, which can act as external cache memory, for example. By way of illustration and not limitation, RAM is available in many forms such as SRAM, DRAM, SDRAM, DDR SDRAM, ESDRAM, SLDRAM, DRRAM, DRDRAM, and RDRAM. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    determining, by a system operatively coupled to a processor, immutable configuration data relating to configuration change processing for a service container; and
    based on the immutable configuration data, determining, by the system, whether to allow a service proxy associated with the service container to process a configuration change associated with the service container and contained in a message associated with an untrusted entity identity, wherein the message is a second message, wherein a first message, comprising information relating to a set of configuration changes, comprising the configuration change, is received by a control plane from a device associated with the untrusted entity identity, wherein the control plane is associated with a service mesh that comprises the service container and the service proxy, wherein the service proxy is associated with a data plane and receives the second message from the control plane, and wherein the second message comprises the information relating to the set of configuration changes.

2. The computer-implemented method of claim 1, wherein the determining of the immutable configuration data comprises determining the immutable configuration data relating to the configuration change processing for the service container of the service mesh based on configuration definition information associated with an application, wherein the configuration definition information is associated with an application owner or manager entity identity associated with the application, and wherein the immutable configuration data is representative of and facilitates implementation of a group of policies that facilitates preventing, by the untrusted entity identity or the device associated with the untrusted entity identity, an unauthorized configuration change relating to an interaction between the application and the service mesh.

3. The computer-implemented method of claim 1, further comprising:
    in response to receiving the message, analyzing, by the system, message information contained in the message, wherein the message information comprises configuration change information relating to the configuration change associated with the service container; and
    based on the analyzing of the message information, determining, by the system, whether the message is attempting or requesting the configuration change relating to an interaction between an application associated with an application owner or manager entity identity and the service mesh that comprises the service container and the service proxy, wherein the service mesh is associated with the application.

4. The computer-implemented method of claim 3, further comprising:
    in response to determining that the message is attempting or requesting the configuration change relating to the interaction between the application and the service mesh, analyzing, by the system, the immutable configuration data associated with the service container and the application; and based on the analyzing of the immutable configuration data, determining, by the system, whether the configuration change is authorized.

5. The computer-implemented method of claim 4, further comprising:

in response to determining that the configuration change is not authorized based on the analyzing of the immutable configuration data indicating that the configuration change is not authorized, determining, by the system, that the configuration change information relating to the configuration change is not allowed to be processed by the service proxy; and controlling, by the system, the service proxy to prevent the service proxy from processing the configuration change information, wherein the preventing the service proxy from processing the configuration change information prevents the configuration change from being implemented.

6. The computer-implemented method of claim 4, further comprising:

in response to determining that the configuration change is authorized based on the analyzing of the immutable configuration data indicating that the configuration change is authorized, determining, by the system, that the configuration change information is allowed to be processed by the service proxy; and controlling, by the system, the service proxy to allow the service proxy to process the configuration change information, wherein the allowing the service proxy to process the configuration change information enables the configuration change to be performed.

7. The computer-implemented method of claim 4, further comprising:

based on the analyzing of the immutable configuration data, determining, by the system, whether a verified signature approving the configuration change is in the immutable configuration data;

in response to determining that the immutable configuration data comprises the verified signature approving the configuration change, determining, by the system, that the configuration change information is allowed to be processed by the service proxy, wherein the verified signature is associated with the application owner or the manager entity identity associated with the application; or in response to determining that the immutable configuration data does not contain the verified signature approving the configuration change, determining, by the system, that the configuration change information is not allowed to be processed by the service proxy.

8. The computer-implemented method of claim 3, wherein the computer-implemented method further comprises:

in response to receiving a third message, analyzing, by the system, third message information contained in the third message; and in response to determining, based on the analyzing of the third message information, that the message is not attempting or requesting a change in configuration relating to the interaction between the application and the service mesh, determining, by the system, that the third message information is allowed to be processed by the service proxy; and controlling, by the system, the service proxy to allow the service proxy to process the third message information.

9. The computer-implemented method of claim 1, further comprising:

communicating, by the system, the immutable configuration data, comprising a secret token and a group of policies relating to the message processing, to the service proxy during a secure boot-up phase of the service proxy, wherein the service proxy securely boots up an application component and the service container associated with an application based on the immutable configuration data;

subsequently receiving, by the system, a certificate signing request, comprising the secret token, from the service proxy; and determining, by the system, whether to approve the certificate signing request based on a result of analyzing the certificate signing request.

10. The computer-implemented method of claim 9, wherein the service container is associated with the service mesh associated with the application, and wherein the computer-implemented method further comprises:

based on the result of the analyzing indicating that the certificate signing request comprises the secret token that was issued to the service proxy:

authenticating, by the system, the service proxy;

approving, by the system, the certificate signing request;

generating, by the system, a signed certificate that indicates the service proxy is authorized to be part of the service mesh associated with the application and perform at least one operation with respect to the application, in accordance with the immutable configuration data; and communicating, by the system, the signed certificate to the service proxy.

11. The computer-implemented method of claim 1, wherein the service proxy is a first service proxy that is associated with the service mesh associated with an application, and wherein the computer-implemented method further comprises:

in connection with a second service proxy requesting to be added in connection with the application, receiving, by the system, a certificate signing request from the second service proxy, wherein the certificate signing request does not contain a secret token;

determining, by the system, whether to approve the certificate signing request based on a result of analyzing the certificate signing request; and based on the result of the analyzing indicating that the certificate signing request does not contain the secret token:

denying, by the system, authentication of the second service proxy, and denying, by the system, the certificate signing request, wherein the denying of the certificate signing request prevents the second service proxy from being part of the service mesh associated with the application and prevents the second service proxy from performing at least one operation with respect to the application.

12. A system, comprising:

a memory that stores computer-executable components; and a processor, operatively coupled to the memory, that executes the computer-executable components, the computer-executable components comprising:

a translator component that generates immutable configuration data relating to configuration change processing that is applicable to a service container of a service mesh based on configuration specification information associated with an application, wherein the configuration specification information is associated with an entity identity associated with the application, and wherein the immutable configuration data relates to a group of policies that facilitates preventing, by an untrusted entity identity or a device associated with the untrusted entity identity, an unauthorized configuration change relating to an interaction between the application and the service mesh; and a message management component that, based on the immutable configuration data, determines whether to permit a service proxy associated with the service container to process a configuration change associated with the service container and contained in a message associated with the untrusted entity identity.

13. The system of claim 12, wherein the message is a second message, wherein a first message, comprising message data relating to a set of configuration changes, comprising the configuration change, is received by a control plane from the device associated with the untrusted entity identity, wherein the service proxy is associated with a data plane and receives the message from a control plane associated with the service mesh that comprises the service proxy and the service container.

14. The system of claim 12, wherein in response to receiving the message associated with the untrusted entity identity, the message management component analyzes message data of the message, and, based on the analysis of the message data, determines that the message is requesting the configuration change relating to the interaction between the application associated with the entity identity and the service mesh, wherein the service container is associated with the application, and wherein the service mesh comprises the service proxy and the service container.

15. The system of claim 12, wherein, in response to determining that the message is requesting the configuration change, the message management component analyzes the immutable configuration data associated with the service container and the application, and, based on the analysis of the immutable configuration data, the message management component determines whether the configuration change is authorized.

16. The system of claim 15, wherein, in response to determining that the configuration change is not authorized, the message management component determines that the configuration change is not permitted to be processed by the service proxy and manages the service proxy to prevent the service proxy from processing and implementing the configuration change; or in response to determining that the configuration change is authorized, the message management component determines that the configuration change is permitted to be processed by the service proxy and manages the service proxy to permit the service proxy to process and implement the configuration change.

17. A computer program product that facilitates secure configuration change processing associated with an application, the computer program product comprising a computer readable storage medium having program instructions embodied therewith, the program instructions are executable by a processor to cause the processor to:

determine fixed configuration data relating to the configuration change processing for a service container, wherein the determining of the fixed configuration data comprises determine the fixed configuration data relating to the configuration change processing associated with the service container of a service mesh based on configuration definition information associated with the application, wherein the configuration definition information is associated with an application owner or a manager identity associated with the application; and based on the fixed configuration data, determine whether to allow a service proxy associated with the service container to process a configuration change associated with the service container and contained in a message associated with a third party entity identity, wherein determining whether to allow the service proxy comprises:

in response to receiving the message associated with the third party entity identity, analyze message data of the message and the fixed configuration data, wherein the message requests the configuration change relating to an interaction between the application and the service mesh; and based on a result of the analysis of the message data and the fixed configuration data, determine whether to allow or disallow the service proxy to implement the configuration change, wherein the fixed configuration data indicates whether the configuration change is allowed.

18. The computer program product of claim 17, wherein determining whether to allow the service proxy further comprises:

in response to determining that the message is attempting or requesting the configuration change relating to the interaction between the application and the service mesh, analyzing the fixed configuration data associated with the service container and the application; and based on the analyzing of the fixed configuration data, determining, whether the configuration change is authorized.

19. The computer program product of claim 18, wherein determining whether to allow the service proxy further comprises:

in response to determining that the configuration change is not authorized based on the analyzing of the fixed configuration data indicating that the configuration change is not authorized, determining that configuration change information in the message relating to the configuration change is not allowed to be processed by the service proxy; and controlling the service proxy to prevent the service proxy from processing the configuration change information, wherein the preventing the service proxy from processing the configuration change information prevents the configuration change from being implemented.

20. The computer program product of claim 18, wherein determining whether to allow the service proxy further comprises:

based on the analyzing of the fixed configuration data, determining whether a verified signature approving the configuration change is in the fixed configuration data;

in response to determining that the fixed configuration data comprises the verified signature approving the configuration change, determining that configuration change information in the message is allowed to be processed by the service proxy, wherein the verified signature is associated with the application owner or the manager entity identity associated with the application; or in response to determining that the fixed configuration data does not contain the verified signature approving the configuration change, determining that the configuration change information is not allowed to be processed by the service proxy.

\* \* \* \* \*